(12) United States Patent
Cheung et al.

(10) Patent No.: US 10,394,757 B2
(45) Date of Patent: Aug. 27, 2019

(54) SCALABLE CHUNK STORE FOR DATA DEDUPLICATION

(75) Inventors: Chun Ho (Ian) Cheung, Bellevue, WA (US); Paul Adrian Oltean, Redmond, WA (US); Ran Kalach, Bellevue, WA (US); Abhishek Gupta, Seattle, WA (US); James Robert Benton, Seattle, WA (US); Ronakkumar Desai, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1012 days.

(21) Appl. No.: 12/949,391

(22) Filed: Nov. 18, 2010

(65) Prior Publication Data

US 2012/0131025 A1    May 24, 2012

(51) Int. Cl.
G06F 16/11    (2019.01)
G06F 16/174   (2019.01)

(52) U.S. Cl.
CPC ........ *G06F 16/122* (2019.01); *G06F 16/1752* (2019.01)

(58) Field of Classification Search
USPC ...................................... 707/755, 802, 803
See application file for complete search history.

(56) References Cited

U.S. PATENT DOCUMENTS

| | | |
|---|---|---|
| 5,813,008 A | 9/1998 | Benson et al. |
| 5,990,810 A | 11/1999 | Williams |
| 6,389,433 B1 | 5/2002 | Bolosky et al. |
| 6,993,520 B2 | 1/2006 | Doyle et al. |
| 7,107,419 B1 | 9/2006 | Ghemawat et al. |
| 7,222,119 B1 | 5/2007 | Ghemawat et al. |

(Continued)

FOREIGN PATENT DOCUMENTS

| | | |
|---|---|---|
| CN | 1846265 A | 10/2006 |
| CN | 101663654 A | 3/2010 |

(Continued)

OTHER PUBLICATIONS

Yang, et al., "FBBM: A new Backup Method with Data Deduplication Capability", Retrieved at << http://ieeexplore.ieee.org/stamp/stamp.jsp?arnumber=04505688 >>, International Conference on Multimedia and Ubiquitous Engineering, Apr. 24-26, 2008, p. 30-35.

(Continued)

*Primary Examiner* — Amresh Singh
(74) *Attorney, Agent, or Firm* — Fiala & Weaver P.L.L.C.

(57) ABSTRACT

Data streams may be stored in a chunk store in the form of stream maps and data chunks. Data chunks corresponding to a data stream may be stored in a chunk container, and a stream map corresponding to the data stream may point to the data chunks in the chunk container. Multiple stream maps may be stored in a stream container, and may point to the data chunks in the chunk container in a manner that duplicate data chunks are not present. Techniques are provided herein for localizing the storage of related data chunks in such chunk containers, for locating data chunks stored in chunk containers, for storing data streams in chunk stores in localized manners that enhance locality and decrease defragmentation, and for reorganizing stored data streams in chunks stores.

19 Claims, 22 Drawing Sheets

(56) References Cited

U.S. PATENT DOCUMENTS

| | | |
|---|---|---|
| 7,246,254 B2 | 7/2007 | Alur et al. |
| 7,340,494 B1 | 3/2008 | Detlefs et al. |
| 7,567,188 B1 | 7/2009 | Anglin et al. |
| 7,636,801 B1 | 12/2009 | Kekre et al. |
| 7,685,182 B2 | 3/2010 | Dussud |
| 7,739,312 B2 | 6/2010 | Gordon et al. |
| 7,774,389 B2 | 8/2010 | Stephens et al. |
| 7,818,495 B2 | 10/2010 | Tanaka et al. |
| 7,856,437 B2 | 12/2010 | Kirshenbaum |
| 7,870,409 B2 | 1/2011 | Murase |
| 7,899,796 B1 | 3/2011 | Borthwick et al. |
| 8,380,681 B2 | 2/2013 | Oltean et al. |
| 8,447,740 B1 | 5/2013 | Huang et al. |
| 2002/0107877 A1 | 8/2002 | Whiting et al. |
| 2002/0133491 A1 | 9/2002 | Sim et al. |
| 2004/0059758 A1 | 3/2004 | Faiman et al. |
| 2004/0068627 A1 | 4/2004 | Sechrest et al. |
| 2006/0020474 A1* | 1/2006 | Stewart et al. .............. 704/500 |
| 2006/0112251 A1 | 5/2006 | Karr et al. |
| 2007/0226443 A1 | 9/2007 | Giampaolo |
| 2007/0250552 A1 | 10/2007 | Lango et al. |
| 2008/0005201 A1 | 1/2008 | Ting et al. |
| 2008/0104107 A1 | 5/2008 | Schwaab et al. |
| 2008/0120459 A1 | 5/2008 | Kaneda et al. |
| 2008/0154985 A1 | 6/2008 | Childs et al. |
| 2008/0155192 A1 | 6/2008 | Iitsuka |
| 2008/0162611 A1 | 7/2008 | Wolczko et al. |
| 2008/0244577 A1 | 10/2008 | Le et al. |
| 2008/0270729 A1 | 10/2008 | Reddy et al. |
| 2009/0013129 A1* | 1/2009 | Bondurant ............ G06F 3/0608 711/115 |
| 2009/0037500 A1 | 2/2009 | Kirshenbaum |
| 2009/0112952 A1 | 4/2009 | Adams et al. |
| 2009/0171888 A1* | 7/2009 | Anglin .............. G06F 17/30156 |
| 2009/0190760 A1 | 7/2009 | Bojinov et al. |
| 2009/0204650 A1 | 8/2009 | Wong et al. |
| 2009/0216788 A1 | 8/2009 | Rao et al. |
| 2009/0254609 A1 | 10/2009 | Wideman |
| 2009/0265506 A1 | 10/2009 | Yim |
| 2009/0271454 A1 | 10/2009 | Anglin et al. |
| 2009/0300321 A1 | 12/2009 | Balachandran et al. |
| 2009/0313248 A1 | 12/2009 | Balachandran et al. |
| 2010/0042790 A1 | 2/2010 | Mondal et al. |
| 2010/0070544 A1 | 3/2010 | Gopalan et al. |
| 2010/0082558 A1 | 4/2010 | Anglin et al. |
| 2010/0082672 A1 | 4/2010 | Kottomtharayil et al. |
| 2010/0082700 A1 | 4/2010 | Parab |
| 2010/0082930 A1 | 4/2010 | Jiva et al. |
| 2010/0088277 A1 | 4/2010 | Rao et al. |
| 2010/0088349 A1 | 4/2010 | Parab |
| 2010/0106691 A1 | 4/2010 | Preslan et al. |
| 2010/0121825 A1 | 5/2010 | Bates et al. |
| 2010/0174881 A1 | 7/2010 | Anglin et al. |
| 2010/0198792 A1 | 8/2010 | Camble et al. |
| 2010/0199042 A1 | 8/2010 | Bates et al. |
| 2010/0205163 A1 | 8/2010 | Eshghi et al. |
| 2010/0223441 A1* | 9/2010 | Lillibridge ............ G06F 3/0608 711/165 |
| 2010/0241654 A1 | 9/2010 | Wu et al. |
| 2010/0299311 A1 | 11/2010 | Anglin et al. |
| 2011/0016095 A1 | 1/2011 | Anglin et al. |
| 2011/0022718 A1 | 1/2011 | Evans et al. |
| 2011/0029739 A1 | 2/2011 | Nakajima et al. |
| 2011/0071989 A1 | 3/2011 | Wilson et al. |
| 2011/0099351 A1* | 4/2011 | Condict .................. 711/216 |
| 2011/0125722 A1 | 5/2011 | Rao et al. |
| 2011/0138154 A1 | 6/2011 | Tevis et al. |
| 2011/0307447 A1 | 12/2011 | Sabaa et al. |
| 2012/0016846 A1 | 1/2012 | Anglin |
| 2012/0130958 A1 | 5/2012 | Kalach et al. |
| 2012/0151177 A1 | 6/2012 | Kalach et al. |
| 2012/0158675 A1 | 6/2012 | Gupta et al. |
| 2012/0159098 A1 | 6/2012 | Cheung et al. |
| 2012/0233417 A1 | 9/2012 | Kalach et al. |
| 2013/0018855 A1* | 1/2013 | Eshghi ................ G06F 11/1453 707/692 |
| 2013/0036277 A1* | 2/2013 | Szczepkowski et al. ..... 711/159 |
| 2013/0060739 A1 | 3/2013 | Kalach et al. |

FOREIGN PATENT DOCUMENTS

| | | |
|---|---|---|
| CN | 101710323 A | 5/2010 |
| CN | 101777370 A | 7/2010 |
| WO | 2010103569 A | 9/2010 |

OTHER PUBLICATIONS

"Transform Your Backup Through Data De-Duplication", Retrieved at << http://www.busmanagement.com/article/Transform-Your-Backup-Through-Data-De-Duplication/ >>, Retrieved Date : Jul. 27, 2010, pp. 2.

Bhagwat, et al., "Extreme Binning: Scalable, Parallel Deduplication for Chunk-based File Backup", Retrieved at << http://www.hpl.hp.com/personal/Mark_Lillibridge/Extreme/final.pdf >>, Proceedings of the 17th IEEE/ACM International Symposium on Modelling, Analysis and Simulation of Computer and Telecommunication Systems, Sep. 2009, pp. 9.

Clements, et al., "Decentralized Deduplication in SAN Cluster File Systems", Retrieved at << http://www.usenix.org/event/usenix09/tech/full_papers/clements/clements_html/ >>.

Burgener, Eric, "Is data deduplication the best capacity optimisation tool?", Retrieved at << http://searchstorage.techtarget.com.au/articles/29797-Is-data-deduplication-the-best-capacity-optimisation-tool- >>, Feb. 26, 2009, pp. 5.

"Data Deduplication and its Benefits", Retrieved at << http://www.mindteck.com/whitepapers/Data-Deduplication.pdf >>, Sep. 9, 2009, pp. 1-7.

"Symantec Advocates Data Deduplication as Part of an Overall Backup Stragegy", Retrieved at << http://www.symantec.com/about/news/release/article.jsp?prid=20070501_01 >>, May 1, 2007, pp. 2.

"International Search Report", dated May 23, 2012, Application No. PCT/US2011/058646, Filed Date: Oct. 31, 2011, pp. 9.

"International Search Report", dated Feb. 27, 2013, Application No. PCT/US2012/051953, Filed Date: Aug. 23, 2012, pp. 9.

"Achieving Storage Efficiency with Data Deduplication", Retrieved at <<http://www.dell.com/downloads/global/products/pvaul/en/nx4-dedup.pdf>>, 2008, pp. 17.

Clements, et al., "Decentralized Deduplication in SAN Cluster File Systems", Retrieved at <<http://www.scs.stanford.edu/~jinyuan/dede.pdf>>, Aug. 1, 2011, pp. 14.

First Office Action and Search Report Received in Chinese Patent Application No. 201110385918.9, dated Mar. 5, 2014, Filed Date: Nov. 17, 2011, 14 Pages.

Non-Final Office Action Received in U.S. Appl. No. 13/223,484, dated Dec. 7, 2012, filed Sep. 1, 2011, 16 Pages.

Final Office Action Received in U.S. Appl. No. 13/223,484, dated Jul. 25, 2013, filed Sep. 1, 2011, 19 Pages.

Non-Final Office Action Received in U.S. Appl. No. 13/223,484, dated Dec. 3, 2013, filed Sep. 1, 2011, 17 Pages.

First Office Action and Search Report Received in Chinese Patent Application No. 201110386132.9, dated Dec. 30, 2013, Filed Date: Nov. 18, 2011, 12 Pages.

Non-Final Office Action Received in U.S. Appl. No. 12/951,760, dated Jun. 20, 2013, filed Nov. 22, 2010, 8 Pages.

Final Office Action Received in U.S. Appl. No. 12/951,760, dated Sep. 30, 2013, filed Nov. 22, 2010, 11 Pages.

Non-Final Office Action Received in U.S. Appl. No. 12/951,760, dated Feb. 13, 2014, filed Nov. 22, 2010, 9 Pages.

Non-Final Office Action Received in U.S. Appl. No. 12/967,984, dated Sep. 13, 2013, filed Dec. 14, 2010, 27 Pages.

Final Office Action Received in U.S. Appl. No. 12/967,984, dated Mar. 24, 2014, filed Dec. 14, 2010, 29 Pages.

First Office Action and Search Report Received in Chinese Patent Application No. 201110436633.3, dated Mar. 4, 2014, Filed Date: Dec. 13, 2011, 11 Pages.

(56) References Cited

OTHER PUBLICATIONS

Non-Final Office Action Received in U.S. Appl. No. 12/971,694, dated Jul. 18, 2013, filed Dec. 17, 2010, 38 Pages.

Final Office Action Received in U.S. Appl. No. 12/971,694, dated Nov. 7, 2013, filed Dec. 17, 2010, 40 Pages.

First Office Action Received in Chinese Patent Application No. 201110428343.4, dated Mar. 5, 2014, Filed Date: Dec. 19, 2011, 14 Pages.

Zhu, et al., "Avoiding the Disk Bottleneck in the Data Domain Deduplication File System", In Proceedings of the 6th USENIX Conference on File and Storage Technologies, Feb. 26, 2008, 14 Pages.

Komiega, Kevin, "Quantum Adds Deduplication to StorNext Software", Published on: Jan. 2010, Available at: http://www.infostor.com/index/articles/InfoStor-Article-Tool-Template/_saveArticle/articles/infostor/storage-management/data-de-duplication/2010/january-2010/quantum-adds_deduplication.html.

Bhagwat, et al., "Extreme Binning: Scalable, Parallel Deduplication for Chunk-based File Backup", In IEEE International Symposium on Modeling, Analysis & Simulation of Computer and Telecommunication Systems, Sep. 21, 2009, 9 Pages.

Correia, Edward J., "Quantum Adds Deduplication to StorNext 4.0", Published on: Jan. 22, 2010, Available at: http://www.networkcomputing.com/print_entry.php?eid=84606.

Carman, et al., "Towards an Economy-based Optimisation of File Access and Replication on a Data Grid", In Proceedings of the 2nd IEEE/ACM International Symposium on Cluster Computing and the Grid, May 21, 2002, 6 Pages.

International Search Report and Written Opinion Issued in PCT Patent Application No. PCT/US2011/058679, dated Jul. 2, 2012, 8 Pages.

Jin, et al., "The Effectiveness of Deduplication on Virtual Machine Disk Images", In Proceedings of SYSTOR: The Israeli Experimental Systems Conference, May 4, 2009, 12 Pages.

Soltesz, et al., "Container-Based Operating System Virtualization: A Scalable, High-Performance Alternative to Hypervisors", In Proceedings of the 2nd ACM SIGOPS/EuroSys European Conference on Computer Systems, Mar. 21, 2007, pp. 1-14.

International Search Report and Written Opinion Issued in PCT Patent Application No. PCT/US2011/064509, dated Jul. 24, 2012, 8 Pages.

International Search Report and Written Opinion Issued in PCT Patent Application No. PCT/US2012/027636, dated Oct. 23, 2012, 8 Pages.

Rao, Goutham, "End to End Dedupe", Published on: Oct. 14, 2009, Available at: http://web.archive.org/web/20101022110513/http://onlinestorageoptimization.com/index.php/tag/dedupe-for-online/.

"Best Practices for Data Deduplication Technology in Disk-based Backup", Published on: Sep. 9, 2009, Available at: http://www.sencilo.com/blog/article/best-practices-for-data-deduplication-technology-in-disk-based-backup/.

Randal, Paul S., "FILESTREAM Storage in SQL Server 2008", Published on: Oct. 2008, Available at: http://msdn.microsoft.com/library/hh461480.

"Introduction to Cisco WAAS", Retrieved on: Oct. 13, 2010, Available at: http://www.cisco.com/c/en/us/td/docs/app_ntwk_services/waas/waas/v407/configuration/guide/cfgd/intro.html.

Shastry, et al., "How to Go Hand-in-hand with DB2 and Informix", Published on: Jan. 25, 2007, Available at: http://www.ibm.com/developerworks/data/library/techarticle/dm-0701shastry/.

Chen, et al., "Profile-Guided Proactive Garbage Collection for Locality Optimization", In Proceedings of the ACM SIGPLAN Conference on Programming Language Design and Implementation, Jun. 2006, 10 Pages.

Joisha, Pramod G., "Compiler Optimizations for Nondeferred Reference-Counting Garbage Collection", In Proceedings of the 5th International Symposium on Memory Management, Jun. 2006, pp. 150-161.

International Search Report and Written Opinion Issued in PCT Patent Application No. PCT/US2011/065662, dated Aug. 27, 2012, 9 Pages.

"Reclaiming Space in a Backup Exec Deduplication Folder", Article ID: TECH 130103, Symantec, Jan. 17, 2010, 3 Pages.

Supplementary Search Report for European Patent Application No. 11842071.0, dated Aug. 31, 2015, 5 Pages.

* cited by examiner

2400

2402 prioritize a plurality of data streams stored as data chunks in a chunk container and as stream maps that include pointers to corresponding data chunks 2404 determine a reorganization of the stored data chunks of the plurality of data streams according to the prioritization 2406 generate a second chunk container that stores the data chunks of the plurality of data streams according to the determined reorganization 2408 modify pointers of the stream maps to point to the data chunks stored in the second chunk container

2502 select a data stream 2504 relocate one or more data chunks pointed to by pointers of a stream map of the selected data stream to be more contiguous than prior to the relocating by displacing at least one data chunk of a data stream having a lower priority than the selected data stream

FIG. 25

SCALABLE CHUNK STORE FOR DATA DEDUPLICATION

BACKGROUND

Data deduplication, also known as data optimization, is the act of reducing the physical amount of bytes of data which need to be stored on disk or transmitted across a network without compromising the fidelity or integrity of the original data. Data deduplication reduces the storage capacity needed to store data, and may therefore lead to savings in terms of storage hardware costs and data management costs. Data deduplication provides a solution to handling the rapid growth of digitally stored data.

Data deduplication may be performed according to one or more techniques to eliminate redundancy within and between persistently stored files. For instance, according to one technique, unique regions of data that appear multiple times in one or more files may be identified, and a single copy of those identified unique regions of data may be physically stored. References to those identified unique regions of data (also referred to as data "chunks") may be stored that indicate the files, and the locations in the files, that include them. This technique is commonly referred to as single instancing. Compression of data may be performed in addition to single instancing. Other data reduction techniques may also be implemented as part of a data deduplication solution.

Difficulties exist in managing data stored according to data de-duplication techniques. For example, due the data fragmentation imposed by data de-duplication, latency may exist in accessing files stored according to de-duplication. This latency limits the adoption of data deduplication solutions, especially on primary storage data, where users expect seamless, fast access to files. Furthermore, data deduplication algorithms may run on a dedicated appliance or on the device that stores and serves data (e.g., a file server). In the case of a file server, data deduplication may not be the primary function of the device, and thus data deduplication techniques may need to be efficient so as not to over consume device resources (e.g., memory, input/output (I/O) mechanisms, central processing unit (CPU) capacity, etc.). Still further, because the quantity of digital data is growing at a very high rate, the size of storage devices (e.g., storage disks) and the total storage capacity associated with computing devices has to grow, causing difficulties with data deduplication techniques that do not scale well with increasing amounts of storage.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for localizing data chunks in storage, for locating stored data chunks, for storing data streams, and for reorganizing stored data streams.

For instance, implementations for localizing data chunks in storage are provided. A data stream is parsed into a sequence of data chunks. Whether any of the sequence of data chunks is/are stored in a chunk container that includes a plurality of data chunks is determined. Data chunks of the sequence of data chunks determined to not be stored in the chunk container are stored in a contiguous arrangement and in a same sequence in the chunk container as in the data stream. Metadata is generated for each data chunk of the sequence of data chunks. The metadata for a data chunk of the sequence of data chunks includes an offset for the data chunk in the data stream, a pointer to a location in the chunk container for the data chunk, and a locality indicator for the data chunk. A stream map is generated for the data stream that includes the generated metadata. The stream map is stored in a stream container.

Furthermore, implementations for reliably locating data chunks in storage are provided. A request for a data chunk is received. The request includes an identifier for the data chunk. The data chunk identifier includes a chunk container identifier, a local identifier, a chunk container generation value, and a first chunk offset value. The chunk container identifier is used to locate a chunk container. If a generation indication for the chunk container matches the chunk container generation value, the data chunk may be located in the chunk container using the first chunk offset value. If the generation indication for the chunk container does not match the chunk container generation value, a redirection table associated with the chunk container is used to locate the data chunk. The redirection table may be searched for an entry that includes a match for the local identifier. The entry includes a second chunk offset value that is different from the first chunk offset value. The data chunk is retrieved from the chunk container at the second chunk offset value.

In a further aspect, implementations for storing and defragmenting a data stream are provided. An indication of a minimum allowable number of repeating data chunks is stored. A sequence of data chunks from the data stream is accumulated. If the accumulated sequence of data chunks is a duplicate sequence (e.g., if the sequence of data chunks matches a stored sequence of data chunks), but has a length less than the minimum allowable number, the sequence of data chunks is stored contiguously in the chunk container as new data chunks. Furthermore, pointers to the new data chunks are stored a stream map for the data stream. If the accumulated sequence of data chunks is determined to be a duplicate sequence, and has a length that is greater than or equal to the minimum allowable number, pointers to the previously stored sequence of data chunks are stored in the stream map for the data stream (rather than storing the accumulated sequence as new data chunks).

Furthermore, implementations for storing and defragmenting a data stream are provided. A fragmentation factor is stored. The fragmentation factor indicates a maximum amount of fragmentation to be allowed for a designated portion of a received data stream. A portion of a data stream that includes a plurality of data chunks is received. A plurality of data chunk sequences in the plurality of data chunks is determined. Each determined data chunk sequence includes a sequence of data chunks duplicating a stored sequence of data chunks stored contiguously in a chunk container. The plurality of data chunks is segmented into a number of data chunk sets corresponding to the fragmentation factor. Pointers to the stored sequence of data chunks for data chunks in a first group of the data chunk sets are stored. Data chunks of the plurality of data chunks other than data chunks in the first group of the data chunk sets are stored in the chunk container.

Still further, implementations for reorganizing stored data streams are provided. Data streams are stored as data chunks (in a chunk container) and as stream maps that include pointers to corresponding data chunks. The data streams are prioritized. A reorganization of the stored data chunks of the plurality of data streams is determined according to the prioritization. A second chunk container that stores the data chunks of the plurality of data streams is generated according to the determined reorganization. Pointers of the stream maps are modified to point to the data chunks stored in the second chunk container.

In one implementation of the reorganization, a data stream is selected. One or more data chunks pointed to by pointers of a stream map of the selected data stream are relocated to be more contiguous than previously by displacing at least one data chunk of a data stream having a lower priority than the selected data stream.

Computer program products are also described herein for managing a chunk store, for storing data chunks in a chunk store in a contiguous manner, for reliably locating data chunks in storage, for storing and/or defragmenting a data stream, for reorganizing stored data streams in storage, and for further embodiments as described herein.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 5 shows the chunk store of FIG. 3, further indicating some data chunks that are referenced by stream maps, according to an example embodiment.

FIGS. 24 and 25 show flowcharts for reorganizing stored data streams, according to example embodiments.

Figure 1:
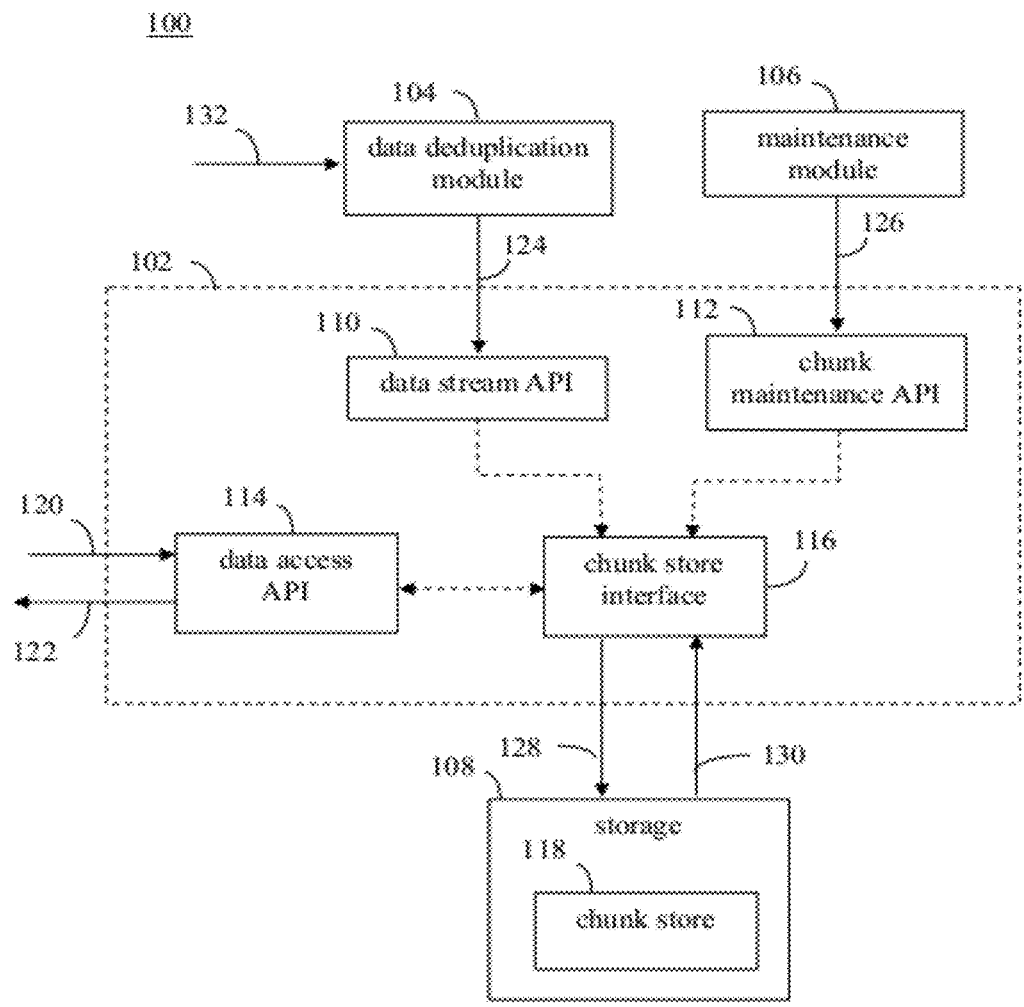
FIG. 1 shows a block diagram of a data deduplication system, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Optimized data in this specification refers to data that has been optimized, or deduplicated, by one or more of data deduplication techniques such as single-instancing of chunks and compression. Optimized streams refer to streams that were deduplicated, or in other words, their data was optimized using data deduplication techniques.

II. Example Embodiments

Embodiments provide techniques for data deduplication. Such embodiments enable the amount of data (e.g., number of bytes) to be stored, or to be transmitted, to be reduced without compromising the fidelity or integrity of the data. For instance, embodiments enable reductions in the amount of latency in accessing optimized data. Furthermore, embodiments enable resources, such as computing machines/devices, to be used more efficiently, reducing resource consumption. Still further, embodiments provide techniques for data deduplication that are scalable with the growth of the amount of digital data that is stored.

For instance, in an embodiment, a scalable chunk store is provided for data deduplication. The chunk store enables various techniques for minimizing latency in optimized data access, and reduces machine resource consumption (e.g., memory and disk I/O) during data deduplication, rehydration and garbage collection. Example embodiments are described in further detail in the following subsections.

A. Example Data Deduplication Embodiments

In embodiments, data to be stored may be optimized to reduce an amount of storage needed for the data. For instance, data streams may be stored in the form of unique data chunks. The data chunks may be referenced by maps that define the data streams. In this manner, the data streams are stored more efficiently, because multiple maps may reference the same stored data chunk, rather than the same data chunk being stored multiple times. Furthermore, the optimized data may be requested (e.g., by applications) from storage as desired. In such case, the data streams may be reassembled from the stored data chunks according to the corresponding maps.

For instance, FIG. 1 shows a block diagram of a data deduplication system 100, according to an example embodiment. As shown in FIG. 1, system 100 includes a storage system 102, a data deduplication module 104, a maintenance module 106, and storage 108. Furthermore, storage system 102 includes a data stream API (application programming interface) 110, a chunk maintenance API 112, and a data access API 114. System 100 is described as follows to illustrate the storage of optimized data, and the recovery of optimized data from storage, and is not intended to be limiting.

System 100 is configured to enable data to be stored in storage 108 in an efficient manner, and for data to be retrieved from storage 108. For example, in an embodiment, data deduplication module 104 may be present. Data deduplication module 104 is configured to optimize received data for storage. For instance, data deduplication module 104 may compress received data received as a data stream 132. Data stream 132 may include a portion of a data file, a single data file, multiple data files, and/or any combination of files and/or file portions. As shown in FIG. 1, data deduplication module 104 generates data chunks 124, which may be a compressed and segmented version of data stream 132.

Data stream API 110 provides an interface for storage system 102 to receive data chunks 124. Data chunks 124 may include a plurality of data chunks that form data stream 132 from which data chunks 124 are generated. Data stream API 110 may be configured in any suitable manner, as would be known to persons skilled in the relevant art(s). Data stream API 110 may output data chunks 124 to be received by chunk store interface 116.

As shown in FIG. 1, storage 108 is coupled to storage system 102. Chunk store interface 116 is an interface between APIs 110, 112, and 114 and storage 108. For example, chunk store interface 116 may receive data chunks 124, and may store the data chunks of data chunks 124 in storage 108. For example, as shown in FIG. 1, storage 108 includes a chunk store 118. Chunk store interface 116 may store the received data chunks of data chunks 124 in chunk store 118 as data chunks 128.

Data access API 114 provides an interface for applications to request data of storage system 102. For instance, as shown in FIG. 1, data access API 114 may receive a data stream request 120. Data access API 114 may be configured in any suitable manner, as would be known to persons skilled in the relevant art(s). Data access API 114 may output data stream request 120 to be received by chunk store interface 116. Chunk store interface 116 may request the data chunks from storage 108 (e.g., from chunk store 118) that correspond to the requested data stream of data stream request 120. Chunk store interface 116 may receive the requested data chunks from storage 108 as data chunks 130, and may provide a data stream that includes data chunks 130 to data access API 114. Data access API 114 may provide the data stream (e.g., one or re-assembled files) to the requesting application as data stream response 122.

Furthermore, maintenance module 106 may be present to perform one or more types of maintenance jobs with respect to data chunks stored in chunk store 118. For example, maintenance module 106 may include a defragmentation module to perform defragmentation of data chunks stored in storage 108. For instance, the defragmentation module may be configured to eliminate empty spaces in storage 108 (e.g., perform compaction), to move related data chunks into a sequence, and/or to perform other related tasks. In another example, maintenance module 106 may include a garbage collection module to perform garbage collection of data chunks stored in storage 108. For instance, the garbage collection module may be configured to delete unused data chunks in storage 108. In further embodiments, maintenance module 106 may perform additional or alternative maintenance tasks with respect to storage 108.

As shown in FIG. 1, chunk maintenance API 112 provides an interface for maintenance module 106 to interact with storage system 102. Maintenance module 106 may generate a maintenance task 126 (e.g., a defragmentation instruction, a compaction instruction, a data chunk deletion instruction, etc.) that is received by chunk maintenance API 112. Chunk maintenance API 112 may be configured in any suitable manner, as would be known to persons skilled in the relevant art(s). Chunk maintenance API 112 may provide maintenance task 126 to chunk store interface 116. Chunk store interface 116 may enable maintenance task 126 to be performed on data chunks stored in storage 108.

Storage system 102 may be implemented in any suitable form, including the form of one or more computers/computing devices, etc. Storage 108 may include one or more of any type of storage mechanism, including a magnetic disc (e.g., in a hard disk drive), an optical disc (e.g., in an optical disk drive), a magnetic tape (e.g., in a tape drive), and/or any other suitable type of storage medium.

Note that data deduplication system 100 is example of an environment in which embodiments of the present invention may be implemented. Data deduplication system 100 is provided for purposes of illustration, and is not intended to be limiting. Embodiments may be incorporated in further types and configurations of data deduplication systems.

B. Example Chunk Store Embodiments that Enable Data Chunk Locality

Chunk store 118 of FIG. 1 may store data streams in the form of data chunks in any manner. For instance, chunk store 118 may store maps that indicate the data chunks included in the data streams, and may store the referenced data chunks. In an embodiment, chunk store 118 does not store duplicate copies of data chunks, according to data de-duplication techniques.

Figure 2:
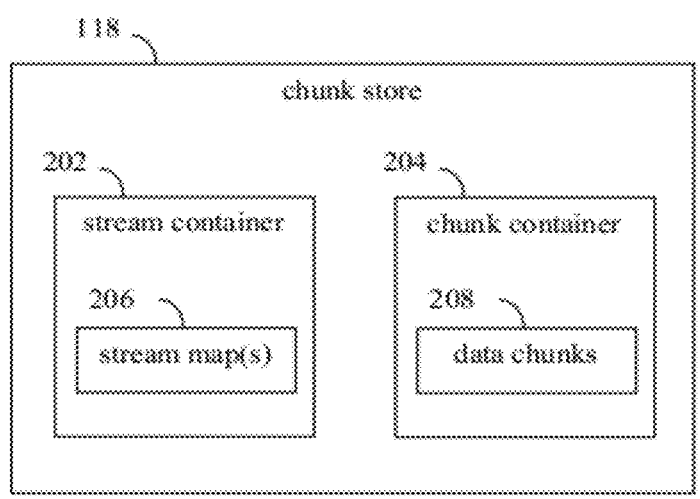
FIG. 2 shows a block diagram of a chunk store, according to an example embodiment.

For instance, FIG. 2 shows a block diagram of chunk store 118, according to an example embodiment. As shown in FIG. 2, chunk store 118 includes a stream container 202 and a chunk container 204. Stream container 202 includes one or more stream maps 206, and chunk container 204 includes a plurality of data chunks 208. A data chunk 208 is a segment of data that is referenced by one or more data streams (e.g., data stream 132 of FIG. 1). A stream map 206 is a data structure that describes the mapping between the original data stream structure and the optimized data chunk structure. Stream map 206 contains data chunk location information, either directly or through an indirection layer, such that the referenced data chunks can be located and assembled into a file stream view. Data chunks 208 and stream maps 206 are stored in stream container 202 and chunk container 204, respectively, which may be files in a file system. In an embodiment, chunk store 118 stores all data in the form of chunks, such that stream maps 206 are stored as data chunks that contain internal metadata (data stream metadata) to describe the file stream-to-data chunk 208 mapping, data chunk addresses, and hashes.

Figure 3:
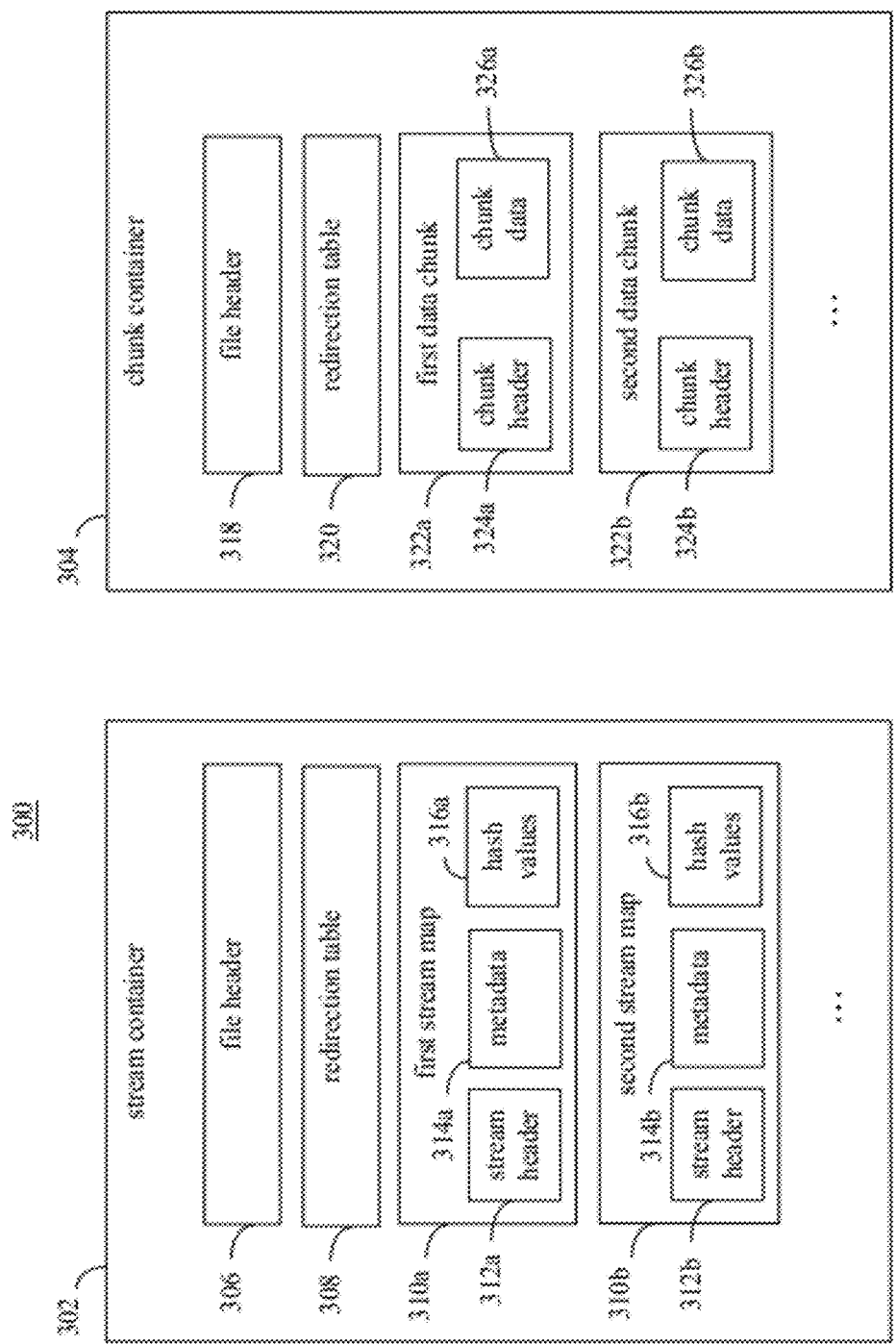
FIGS. 3 and 5 show block diagrams of a chunk store, according to example embodiments.

Stream container 202 and chunk container 204 may be configured in various ways, in embodiments. For instance, FIG. 3 shows a block diagram of a chunk store 300, according to an example embodiment. Chunk store 300 is an example of chunk store 118 of FIG. 2. As shown in FIG. 3, chunk store 300 includes a storage container 302 and a chunk container 304. Storage container 302 is an example of storage container 202 of FIG. 2, and chunk container 304 is an example of chunk container 204 of FIG. 2. In the embodiment of FIG. 3, storage container 302 includes a file header 306, a redirection table 308, and a plurality of stream maps 310. First and second stream maps 310a and 310b are shown in FIG. 3 for purposes of illustration, but in embodiments, any number of stream maps 310 may be included in stream container 302, including hundreds, thousands, and even greater numbers of stream maps 310. Chunk container 304 includes a file header 318, a redirection table 320, and a plurality of data chunks 322. First and second data chunks 322a and 322b are shown in FIG. 3 for purposes of illustration, but in embodiments, any number of data chunks 322 may be included in chunk container 304, including hundreds, thousands, and even greater numbers of data chunks 322. These features of FIG. 3 are described as follows.

File header 306 is a file header for stream container 302 in an embodiment where stream container 302 is stored as a file. File header 306 may include information associated with stream container 302, including a stream container identifier (e.g., a stream container identification number), etc.

Redirection table 308 is optionally present in stream container 302. When present, redirection table 308 may store information regarding changes in location in stream container 302 of any of stream maps 310. For example, first stream map 310a may be deleted from stream container 302, and second stream map 310b may be moved to the location of first stream map 310a (e.g., due to a defragmentation or compaction routine). Subsequent to the move, stream container 302 may be accessed by an application to retrieve second stream map 310b. However, the application may still be using the prior location of second stream map 310b. Redirection table 308 may include a mapping for second stream map 310b that indicates the current location of second stream map 310b. As such, the application may access redirection table 308 to determine the current location of second stream map 310b, and may thereby be enabled to retrieve second stream map 310b from its new location.

Stream maps 310 are examples of stream maps 206 of FIG. 2. Each of stream maps 310 is used to define the sequences of data chunks 322 that make up a particular data stream. As shown in FIG. 302, each of stream maps 310 includes a stream header 312, metadata 314, and hash values 316. For instance, first stream map 310a is shown including stream header 312a, metadata 314a, and hash values 316a, and second stream map 310b is shown including stream header 312b, metadata 314b, and hash values 316b. Each stream header 312 includes information associated with the corresponding stream map 310, such as a stream map identifier (e.g., a stream map identification number), etc. Each metadata 314 includes information describing the data chunks 322 that make up the data stream defined by the corresponding stream map 310. Hash values 316 are optionally present. Hash values 316 are hash values for the data chunks 322 that make up the data stream defined by the corresponding stream map 310. Hash values 316 may be stored in stream maps 310 in order to provide efficient access to a hash vector of the data chunks that make up the corresponding data stream. For instance, this may be useful for wire data transfer scenarios where fast access to full list of data stream hashes (hashes for all the optimized file chunks) is desired.

Figure 4:
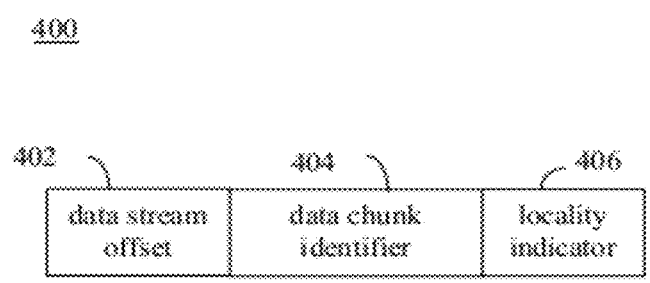
FIG. 4 shows a block diagram of metadata included in a stream map, according to an example embodiment.

Various types of information may be included in metadata 314. For instance, FIG. 4 shows a block diagram of metadata 400, according to an example embodiment. Metadata 400 is an example of metadata 314 of FIG. 3. Metadata 400 is an example of metadata that may be included in stream map 310 for each referenced data chunk 322 (e.g., per-chunk metadata). As shown in FIG. 4, metadata 400 includes a data stream offset 402, a data chunk identifier 404, and a locality indicator 406. Data stream offset 402 indicates a location for the associated data chunk 322 in the data stream defined by the particular stream map 310. For example, data stream offset 402 may indicate a number of bytes from the beginning of the data stream, or from other reference point in the data stream, at which the associated data chunk 322 begins. Data chunk identifier 404, also known as a chunk id or "reliable chunk locator," is a reference or pointer to the corresponding data chunk 322 in chunk container 304. For instance, data chunk identifier 404 for a particular data chunk enables the data chunk to reliably be located in chunk container 304. Data chunk identifier 404 may have various forms, including the example forms described in further detail below (e.g., with reference to FIG. 13). Locality indicator 406 is information that represents a chunk insertion order in chunk container 304, enabling a determination to be made of which data chunks 322 may be referenced by a common stream map 310. For instance, locality indicator 406 enables data chunks 322 associated with a same stream map 310 to be stored contiguously in chunk container 304, or to be stored closely together if contiguous storage is not straightforward (e.g., due to multiple stream maps 310 referencing the same data chunk 322). Locality indicator 406 may further be used by other data deduplication components such as a chunk hash index to improve hash lookup and insertion performance.

With reference to chunk container 304 of FIG. 3, file header 318 is a file header for chunk container 302 in an embodiment where chunk container 304 is stored as a file. File header 318 may include information associated with chunk container 304, including a chunk container identifier (e.g., a chunk container identification number), a chunk container generation indicator that indicates a revision number of chunk container 304, etc.

Redirection table 320 is optionally present in chunk container 304. When present, redirection table 320 may store information regarding changes in location in chunk container 304 of any of data chunks 322, in a similar manner as how redirection table 308 of stream container 302 handles changes in location of stream maps 310.

Data chunks 322 are examples of data chunks 208 of FIG. 2. As shown in FIG. 3, each of data chunks 322 includes a chunk header 324 and chunk data 326. For instance, first data chunk 322a includes chunk header 324a and chunk data 326a, and second data chunk 322b includes chunk header 324b and chunk data 326b. Each chunk header 312 includes information associated with the corresponding data chunk 322, such as a data chunk identifier, etc. Each chunk data 326 includes the corresponding data, which may be in compressed or non-compressed form.

Stream maps 310 and data chunks 322 are stored in stream container 302 and chunk container 304, respectively, to enable data deduplication and data de-duplication. For instance, chunk store interface 116 of FIG. 1 may receive data chunks 124 associated with data streams 132, and may store the data chunks in chunk store 300 of FIG. 3. For instance, for a particular data stream 132, chunk store interface 116 may generate a stream map that is stored in stream container 302 as a stream map 310 that references one or more data chunks 322 stored in chunk container 304 by chunk store interface 116.

Figure 5:
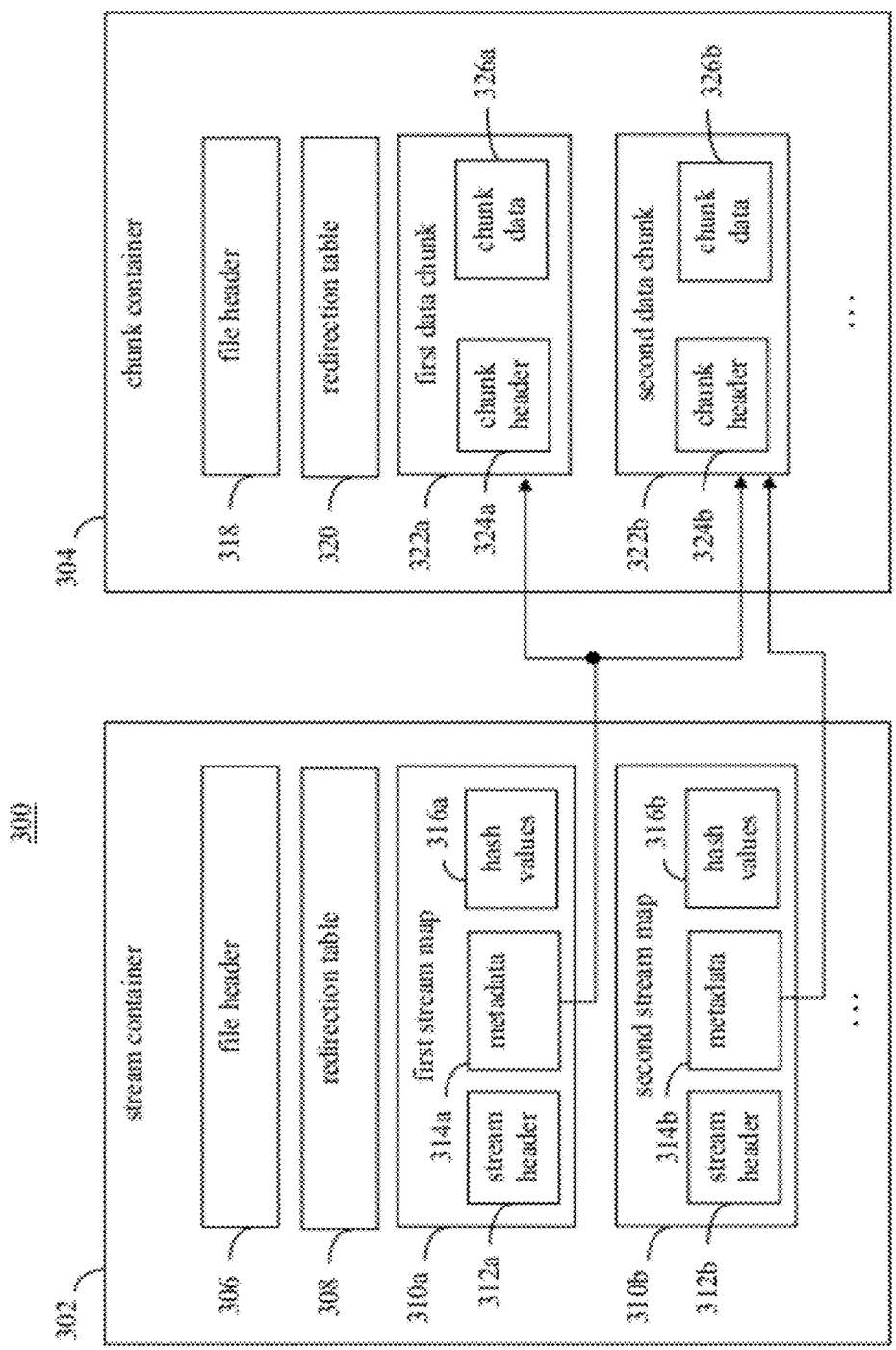

For instance, FIG. 5 shows chunk store 300 of FIG. 3, and indicates some data chunks 322 that are referenced by stream maps 310, according to an example embodiment. As shown in FIG. 5, first stream map 310a includes metadata 314a that includes references to first and second data chunks 322a and 322b in chunk container 304. Thus, first and second data chunks 322a and 322b are included in the source data stream associated with first stream map 310a. For example, metadata 314a may include a data stream offset 402 value for first data chunk 322a that indicates a location of first data chunk 322a in the source data stream defined by first stream map 310a, a data chunk identifier 404 for first data chunk 322a in chunk container 304 (e.g., the data chunk identifier for first data chunk 322a stored in chunk header 324a), and a locality indicator 406 for first data chunk 322a. Furthermore, metadata 314a may include a data stream offset 402 value for second data chunk 322b that indicates a location of second data chunk 322b in the source data stream, a data chunk identifier 404 for second data chunk 322b in chunk container 304 (e.g., the data chunk identifier for second data chunk 322b stored in chunk header 324b), and a locality indicator 406 for second data chunk 322b. In an embodiment, first and second data chunks 322a and 322b may have a same value for their locality indicators that is generated to correspond to the source data stream defined by first stream map 310a, and that indicates that first and second data chunks 322a and 322b are contiguously (adjacently) stored in chunk container 304.

Furthermore, second stream map 310b includes metadata 314b that includes references to second data chunk 322b in chunk container 304. For example, metadata 314b may include a data stream offset 402 value for second data chunk 322b that indicates a location of second data chunk 322b in the source data stream defined by second stream map 310b, a data chunk identifier 404 for second data chunk 322b in chunk container 304 (e.g., the data chunk identifier for second data chunk 322b stored in chunk header 324b), and a locality indicator 406 for second data chunk 322b. The locality indicator 406 in metadata 314b for second data chunk 322b has the same value as the locality indicators generated for first and second data chunks 322a and 322b because second data chunk 322b was originally stored in chunk container 304 for first stream map 310a. Any further data chunks 322 (not shown in FIG. 5) that were newly stored in chunk container 304 when the source data stream defined by second stream map 310b was stored in chunk store 300 are assigned a new value for locality indicator 406.

Figure 6:
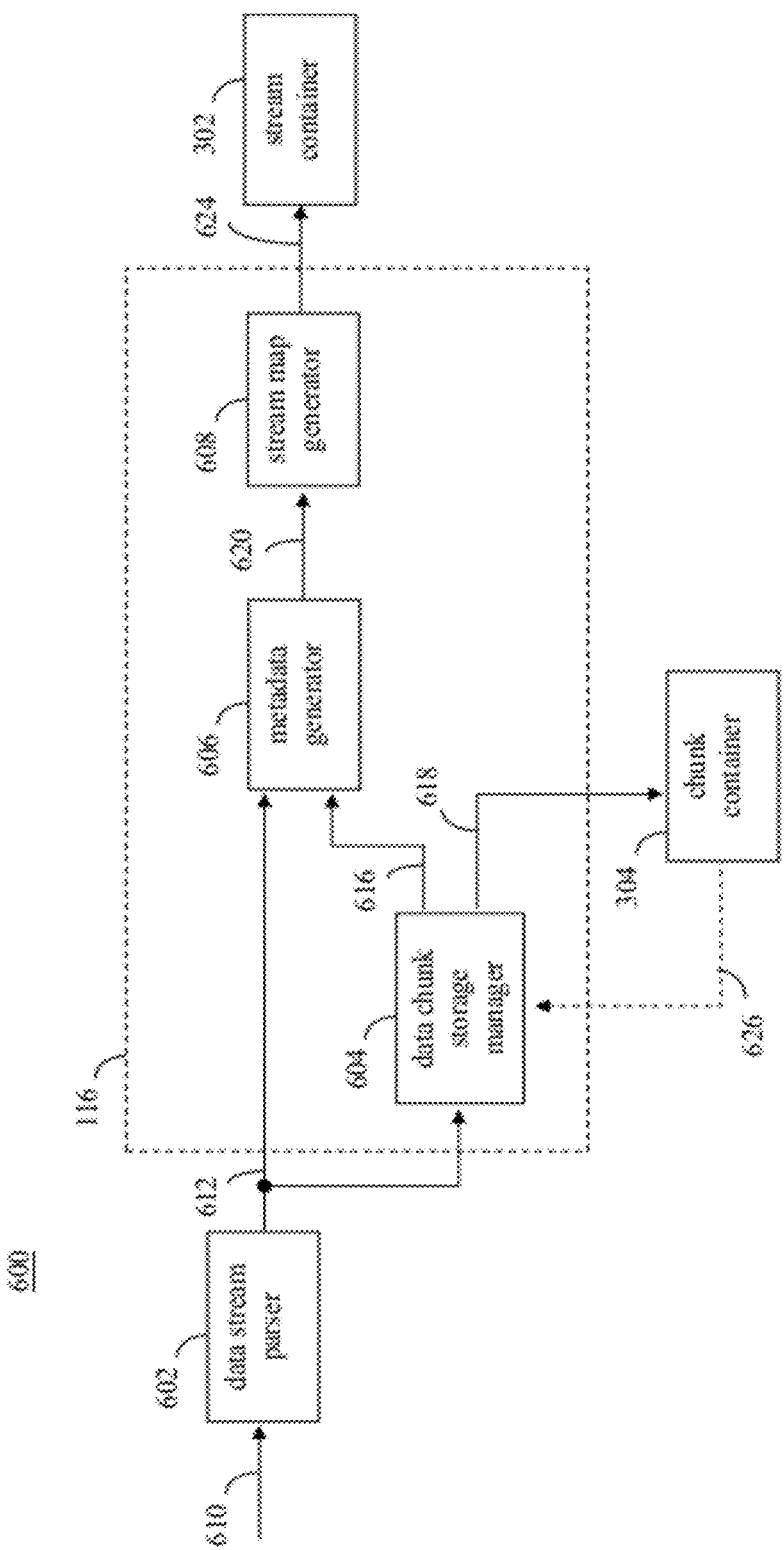
FIG. 6 shows a block diagram of a data stream store system, according to example embodiment.
Figure 7:
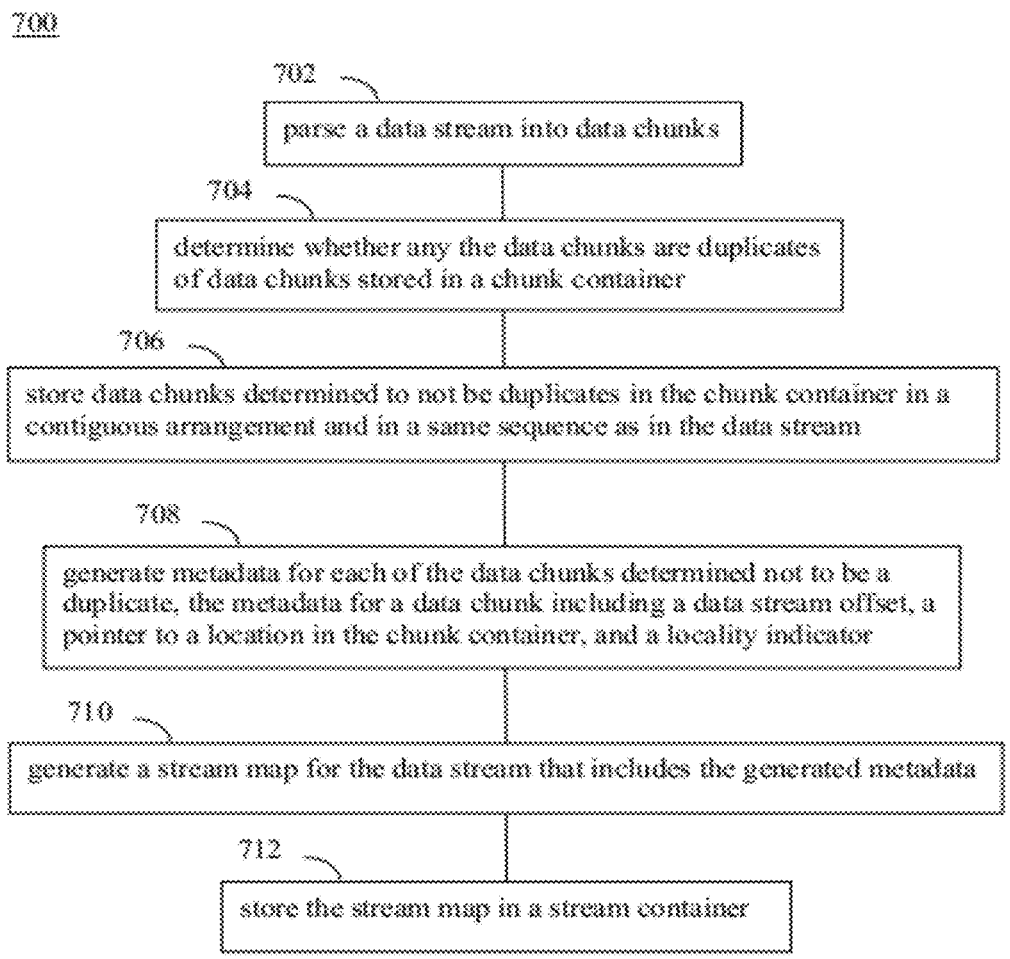
FIG. 7 shows a flowchart for storing a data stream, according to an example embodiment.

Chunk store interface 116 of FIG. 1 may be configured in various ways to store data streams in chunk store 300 of FIG. 3. For instance, FIG. 6 shows a block diagram of data stream store system 600, according to example embodiment. As shown in FIG. 6, data stream store system 600 includes a data stream parser 602, chunk store interface 116, stream container 302, and chunk container 304. In an embodiment, data stream parser 602 may be included in data deduplication module 104 of FIG. 1. In the embodiment of FIG. 6, chunk store interface 116 includes a data chunk storage manager 604, a metadata generator 606, and a stream map generator 608. These features of FIG. 6 are described as follows with respect to FIG. 7. FIG. 7 shows a flowchart 700 for storing a data stream, according to an example embodiment. In an embodiment, system 600 of FIG. 6 may operate according to flowchart 700. Further structural and operational embodiments will be apparent to persons skilled in the relevant art(s) based on the discussion regarding flowchart 700. Flowchart 700 and system 600 are described as follows.

Flowchart 700 begins with step 702. In step 702, a data stream is parsed into data chunks. For example, as shown in FIG. 6, data stream parser 602 may receive a data stream 610. Data stream 610 may include one or more files and/or portions of files, similarly to data stream 132 of FIG. 1. Data stream parser 602 is configured to parse data stream 610 into a sequence of data chunks, indicated as data chunk sequence 612. For instance, in an embodiment, data chunk sequence 612 may include the sequence of data chunks in the order the data chunks are located in data stream 610. The data chunks of data chunk sequence 612 may have the same size or may have different sizes.

In step 704, whether any of the data chunks are duplicates of data chunks stored in a chunk container is determined. For example, as shown in FIG. 6, data chunk storage manager 604 receives data chunk sequence 612. Data chunk storage manager 604 is configured to determine whether any of the data chunks of data chunk sequence 612 are already stored in chunk container 304, and therefore are duplicates. For example, in an embodiment, as shown in FIG. 6, data chunk storage manager 604 may receive data chunk information 626 from chunk container 304, which may include hash values for each data chunk 322 stored in chunk container 304. In another embodiment, data chunk storage manager 604 may receive hash values 316 (FIG. 3) from stream container 302, which are hash values for data chunks 322 stored in chunk container 304. Data chunk storage manager 604 may generate a hash value for each data chunk of data chunk sequence 612, and may compare the generated hash values to the hash values received in data chunk information 626 (or from stream container 302) to determine which data chunks of data chunk sequence 612 are already stored in chunk container 304. In further embodiments, data chunk storage manager 604 may determine which data chunks of data chunk sequence 612 are already stored in chunk container 304 in other ways, as would be known to persons skilled in the relevant art(s).

As shown in FIG. 6, data chunk storage manager 604 generates a stored chunk indication 616, which indicates which data chunks of data chunk sequence 612 are already stored in chunk container 304.

Referring back to FIG. 7, in step 706, data chunks determined to not be duplicates are stored in the chunk container in a contiguous arrangement and in a same sequence as in the data stream. For example, in an embodiment, data chunk storage manager 604 may be configured to store the data chunks of data chunk sequence 612 that were not determined to be stored in chunk container 304. For example, in an embodiment, data chunk storage manager 604 may generate a chunk header 324 (e.g., a data chunk identifier) for each new data chunk, and store each new data chunk as a data chunk 322 with chunk header 324 and chunk data 326. Furthermore, in an embodiment, data chunk storage manager 604 is configured to store the new data chunks in a contiguous arrangement in chunk container 304, in a same order as in the source data stream (e.g., in the order received in data chunk sequence 612).

In step 708, metadata is generated for each of the data chunks determined not to be a duplicate, the metadata for a data chunk including a data stream offset, a pointer to a location in the chunk container, and a locality indicator. For example, as shown in FIG. 6, metadata generator 606 may receive data chunk sequence 612 and stored chunk indication 616. In an embodiment, metadata generator 606 may be configured to generate metadata (e.g., metadata 314 of FIG. 3). Metadata generator 606 may generate metadata for each data chunk of data chunk sequence 612, including data stream offset 402, data chunk identifier 404, and locality indicator 406. For data chunks determined to already be stored in chunk container 304 (in step 704), data chunk identifier 404 is configured to point at the already stored data chunk. For data chunks newly stored in chunk container 304 in step 708, data chunk identifier 404 is configured to point at the newly stored data chunk.

Figure 8:
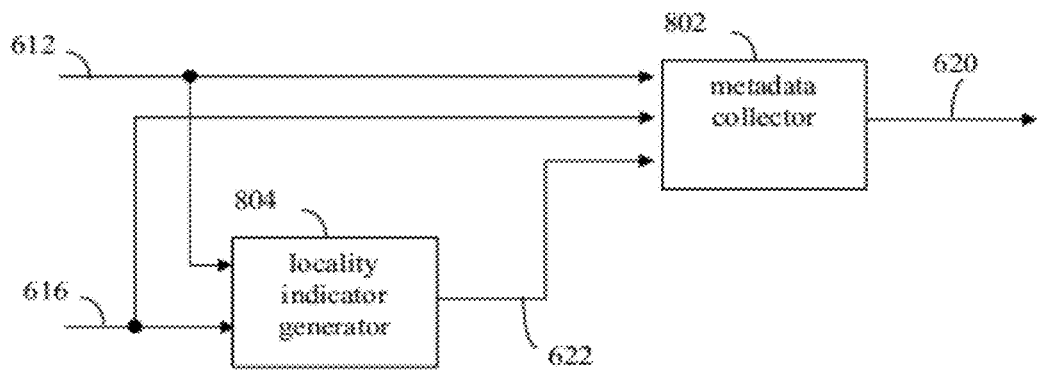
FIG. 8 shows a block diagram of a metadata generator, according an example embodiment.

Metadata generator 606 may be configured in various ways to generate metadata, in embodiments. For instance, FIG. 8 shows a block diagram of metadata generator 606, according an example embodiment. As shown in FIG. 8, metadata generator 606 includes a metadata collector 802 and a locality indicator generator 804. As shown in FIG. 8, locality indicator generator 804 receives data chunk sequence 612 and stored chunk indication 616. Locality indicator generator 804 is configured to generate a locality indicator 406 for each data chunk of data chunk sequence 612 not indicated by stored chunk indication 616 to already be stored in chunk container 304. As shown in FIG. 8, locality indicator generator 804 generates one or more locality indicator values 622, which indicates locality indicators 406 for each data chunk in data chunk sequence 612.

Metadata collector 802 receives locality indicator values 622, data chunk sequence 612, and stored chunk indication 616. Metadata collector 802 collects metadata for each chunk of data chunk sequence 612. For instance, metadata collector 802 may determine a data stream offset 402 for each data chunk received in data chunk sequence 612. For example, metadata collector 802 may determine a data stream offset 402 for each data chunk based on the order in which data chunks are received in data chunk sequence 612, and/or a length of the received data chunks (e.g., a data stream offset 402 may be set for a data chunk as a sum of the lengths of the data chunks received in data chunk sequence 612 prior to the data chunk, or in other manner). Metadata collector 802 may generate a data chunk identifier 404 for each data chunk to identify each data chunk in chunk container 304. Metadata collector 802 assigns to each data chunk the corresponding locality indicator value received in locality indicator values 622. Metadata collector 802 outputs the metadata associated with each data chunk received in data chunk sequence 612 as data chunk metadata 620.

Figure 9:
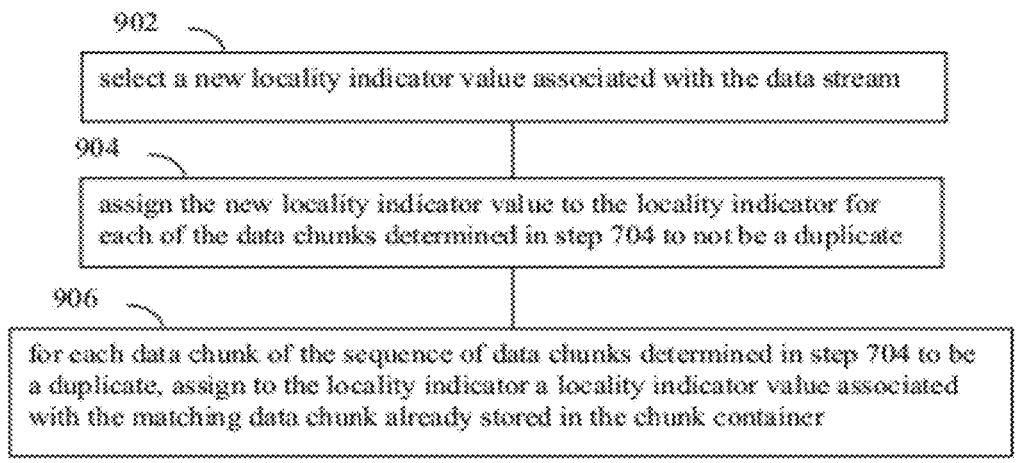
FIG. 9 shows a flowchart for assigning locality indicators, according to an example embodiment.

In an embodiment, metadata generator 606 may assign locality indicator values 622 according to FIG. 9. FIG. 9 shows a flowchart 900 for assigning locality indicators, according to an example embodiment. Flowchart 900 begins with a step 902. In step 902, a new locality indicator value associated with the data stream is selected. For example, when data chunk sequence 612 is received for a data stream, locality indicator generator 804 may select a new locality indicator value to be associated with the data stream. The new locality indicator value is unique, being different from the locality indicator values being used for previously received data streams already having data chunks stored in chunk container 304. For instance, the new locality indicator value may be a unique number generated to be associated with a data stream. Locality indicator generator 804 outputs the selected locality indicator value as selected locality indicator value 622.

In step 904, the new locality indicator value is assigned to the locality indicator for each of the data chunks determined in step 704 to not be a duplicate. For instance, as shown in FIG. 8, selected locality indicator value 622 is received by metadata collector 802. Metadata collector 802 is configured to assign selected locality indicator value 622 as locality indicator 406 to each data chunk of a first set of data chunks of data chunk sequence 612 indicated by stored chunk indication 616 to not already be stored in chunk container 304 (i.e., the new data chunks).

In step 906, for each data chunk determined in step 704 to be a duplicate, a locality indicator value associated with the matching data chunk already stored in the chunk container is assigned to the locality indicator. For example, each data chunk 322 that is already stored in chunk container 304 (a duplicate data chunk) has a locality indicator 406 already assigned, because a locality indicator value is assigned to a data chunk 322 when the data chunk 322 is originally stored in chunk container 304. In an embodiment, for data chunks indicated by stored chunk indication 616 to be already stored in chunk container, metadata collector 802 assigns the locality indicator value associated with the data chunk already stored in chunk container 304 to the matching/duplicate data chunk received in data chunk sequence 612. Thus, one or more sets of data chunks in data chunk sequence 612 may each be assigned a corresponding locality indicator value associated with the corresponding data chunks stored in chunk container 304.

Referring back to FIG. 7, in step 710, a stream map is generated for the data stream that includes the generated metadata. For example, as shown in FIG. 6, stream map generator 608, receives data chunk metadata 620 for each data chunk received in data chunk sequence 612 for a particular data stream. Stream map generator 608 generates a stream map 624 associated with the data stream that includes data chunk metadata 620 for each received data chunk. Furthermore, stream map generator 608 may generate a stream header 312 for stream map 624, and may include hash values 316 for each received data chunk in stream map 624.

In step 712, the stream map is stored in a stream container. For instance, as shown in FIG. 6, stream map generator 608 may store (or "persist") stream map 624 in stream container 302 (e.g., as a stream map 310).

Figure 10:
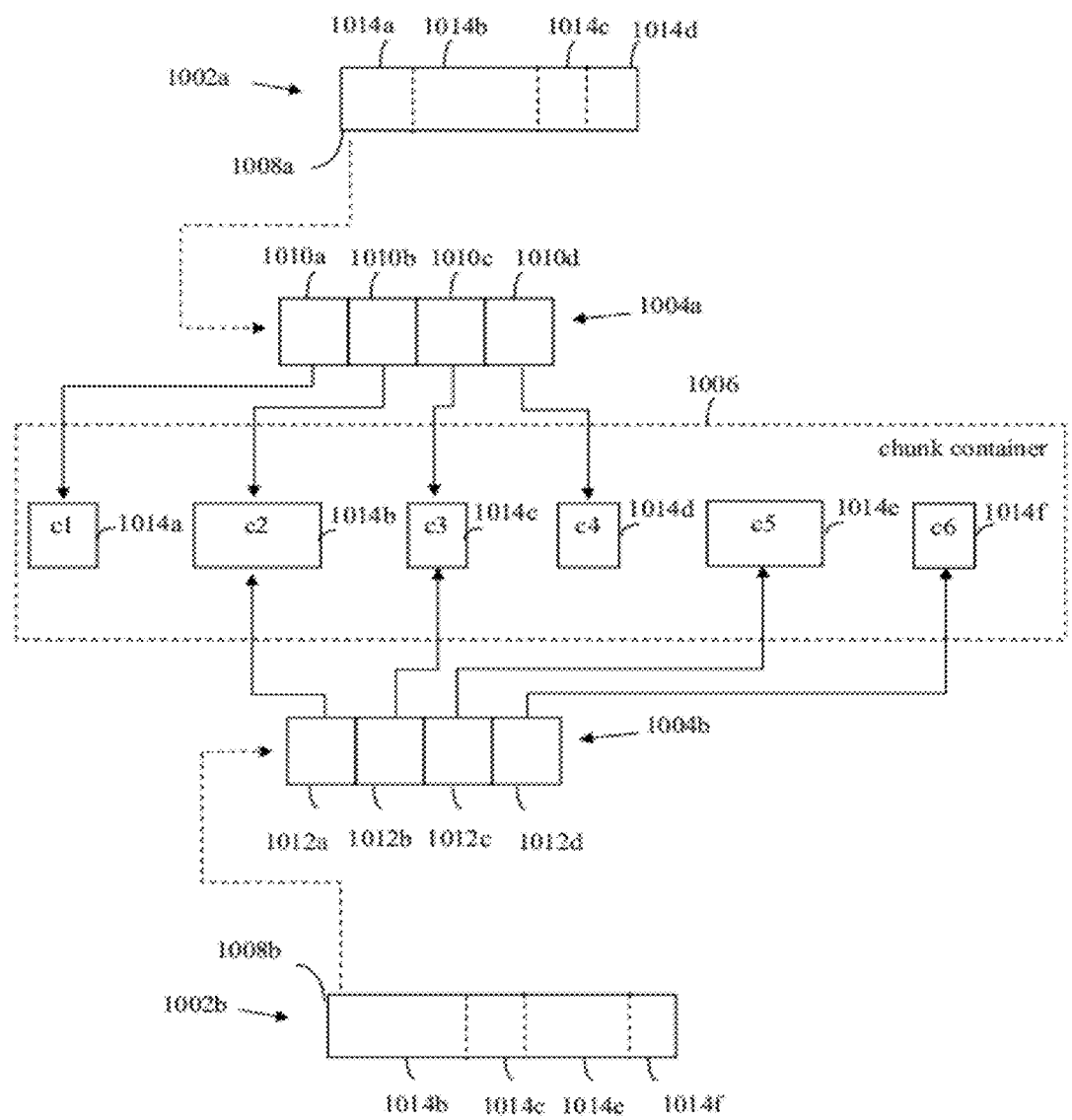
FIG. 10 shows a block diagram that illustrates an example of the storing of data streams in a data store, according to an embodiment.

FIG. 10 shows a block diagram that illustrates an example of the storing of data streams in a data store, according to an embodiment. FIG. 10 is provided for purposes of illustration, and is not intended to be limiting. In the example of FIG. 10, a first data stream 1002a is stored in a data store, followed by a second data stream 1002b being stored in the data store. A stream link 1008a (also known as "stream pointer" or "stream stub") is shown for first data stream 1002a, and a stream link 1008b is shown for second data stream 1002b. As shown in FIG. 10, first data stream 1002a includes four data chunks 1014a-1014d. A stream map 1004a may be generated for first data stream 1002a, and the four data chunks 1014a-1014d may be stored in a chunk container 1006, as described above. Stream map 1004a includes pointers (represented by arrows in FIG. 10) to each of data chunks 1014a-1014d. Data chunks 1014a-1014d may be categorized in a single set of all new, unique data chunks to chunk container 1006. As such, data chunks 1014a-1014d may be stored in chunk container 1006 in a contiguous arrangement, in a same order as in data stream 1002a. For example, data chunks 1014a-1014d may be the first four data chunks stored in chunk container 1006, or if one or more data chunks are already stored in chunk container 1006, data chunks 1014a-1014d may be stored in chunk container 1006 immediately after the already stored data chunks. Each of data chunks 1014a-1014d is assigned the same locality indicator value in stream map 1004a, the locality indicator value selected for first data stream 1002a.

Second data stream 1002b includes four data chunks 1014b, 1014c, 1014e, and 1014f. A stream map 1004b may be generated for second data stream 1002b. Data chunks 1014b, 1014c, 1014e, and 1014f may be categorized into two sets of data chunks according to step 704 of flowchart 700: a first set that includes chunks 1014b and 1014c, which already have copies residing in chunk container 1006 (due to the chunk sequence of first data stream 1002a), and a second set that includes chunks 1014e and 1014f, which are new, unique data chunks (that do not have copies already stored in chunk container 1006). Because data chunks 1014b and 1014c are already stored in chunk container 1006, stream map 1004b includes pointers (values for data chunk identifier 404) to data chunks 1014b and 1014c already stored in chunk container 1006. Thus, data chunks 1014b and 1014c may be stored as pointers to existing data chunks in chunk container 1006 without storing chunk data of data chunks 1014b and 1014c. Because data chunks 1014e and 1014f are not already stored in chunk container 1006, data chunks 1014e and 1014f may be stored in chunk container 1006, as described above. For instance, because data chunks 1014e and 1014f are new, unique data chunks to chunk container 1006, chunks 1014e and 1014f may be stored in chunk container 1006 in a contiguous arrangement, in a same order as in data stream 1002b, after the last stored data chunk currently stored in chunk container 1006 (e.g., data chunk 1014d). Stream map 1004b includes first-fourth data chunk identifiers 1012a-1012d, which point to data chunks 1014b, 1014c, 1014e, and 1014f stored in chunk container 1006, respectively. In stream map 1004b, data chunks 1014b and 1014c are assigned the locality indicator value associated with first data stream 1002a (according to step 906 in FIG. 9), and data chunks 1014e and 1014f are assigned the locality indicator value selected for second data stream 1002b (e.g., according to steps 902 and 904 in FIG. 9).

Note that any number of additional data streams 1002 may be stored in a similar manner following data streams 1002a and 1002b. Furthermore, note that in the example of FIG. 10, data chunks of second stream map 1004b were each assigned one of two locality indicator values—either the new locality indicator value selected for second stream map 1004b, or the locality indicator value associated with the data chunks of first stream map 1004a. In embodiments, data chunks of a particular stream map may be assigned one of any number of locality indicator values, depending on the number of different locality indicators associated with data chunks of the stream map that are already present in the chunk container. For instance, as described above, new data chunks to a chunk container may be assigned the new locality indicator value selected for the particular data stream associated with the stream map. Furthermore, any number of data chunks referenced by the stream map that are already present in the chunk container are assigned the corresponding locality indicator values of the data chunks already present in the chunk container. This may mean that any number of one or more sets of data chunks of the data stream may be assigned corresponding locality indicator values, such that data chunks of the data stream may be assigned locality indicators selected from two, three, or even more different locality indicator values.

As such, locality indicators of stream map metadata enable the locality of data chunks in data streams to be ascertained. This is because duplicate data chunks tend to occur in groups. When a new data stream contains an already known data chunk (already stored in the chunk container), there is a reasonable probability that the next data chunk in the new data stream is also a duplicate data chunk (already stored in the chunk container). Because new, original data chunks are stored in the chunk container adjacent to one another according to the locality indicator, the already present data chunks that the new data stream references are more likely to also be contiguously stored in the chunk container. This aids in improving the performance of reading optimized data streams from a chunk store. For instance, a rehydration module configured to re-assemble a data stream based on the corresponding stream map and data chunks can perform a read-ahead on the data chunks stored in the chunk container, expecting to find the next data chunk needs in the read-ahead buffer. Furthermore, chunk store maintenance tasks like defragmentation and compaction can perform their tasks while attempting to maintain the original locality by keeping the existing adjacent chunks together as they are move around the chunk container.

Figure 11:
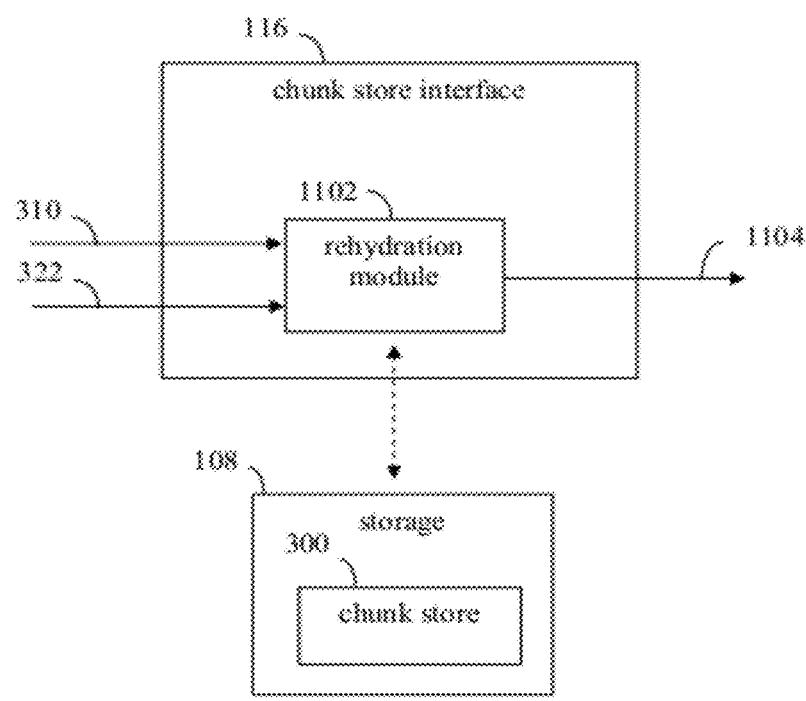
FIG. 11 shows a block diagram of a chunk store interface that includes a rehydration module, according to an example embodiment.

For instance, after data streams are optimized and stored in chunk store 300 in the form of stream maps 310 and data chunks 322, the data streams may be read from chunk store 300. FIG. 11 shows a block diagram of chunk store interface 116 including a rehydration module 1102, according to an example embodiment. Rehydration module 1102 is configured to re-assemble a requested data stream (e.g., requested according to data stream request 120 shown in FIG. 1). For instance, for a data stream to be read from chunk store 300 in response to a data stream request 120 (FIG. 1), rehydration module 1102 determines and receives the stream map 310 referenced by the optimized file of the data stream request 120 from chunk store 300 (e.g., at the reparse location). For instance, rehydration module 1102 may provide a stream map identifier of request 120 to chunk store 300 of FIG. 3. Chunk store 300 retrieves the corresponding stream map 310 based on the stream map identifier (e.g., by scanning stream map headers 312), and rehydration module 1102 may regenerate or "rehydrate" the data stream according to the retrieved stream map 310. The retrieved stream map 310 includes pointers (data chunk identifier 404 of FIG. 4) to each of the data chunks in chunk container 304 included in the data stream. Rehydration module 1102 uses the pointers to retrieve each of the data chunks 322. Rehydration module 1102 may use data stream offsets 402 included in the retrieved stream map 310 (e.g., plus data chunk length information that may be included in the retrieved stream map 310) to arrange the retrieved data chunks 322 in the proper order to re-generate the data stream, which is output by rehydration module 1102 as data stream 1104.

Through the use of locality indicators 406, sequential reads of data chunks 322 from chunk container 304 may be performed. For instance, when a file stream is being accessed in chunk store 300 by rehydration module 1102 using sequential I/O (input/output) requests, or any I/O requests that encompass more than one data chunk boundary, stream map 310 enables fast access to data chunks. This is because at the time that chunk store 300 creates stream maps 310, new data chunks are stored in chunk container 304 contiguously in stream-map order. As such, during a sequential data access by rehydration module 1102, data chunks belonging to the same data stream are likely to be stored contiguously, such contiguous data chunks may be accessed and read with a single data access "seek" (e.g., movements forward or backward through a chunk container to find a next stored data chunk to read), and fragmentation is reduced to non-unique data chunks (the data chunks referenced by a stream map that were already present in the chunk container prior to storing the corresponding data stream). Data access seeks during sequential data access are limited to the case where a data chunk or a series of chunks of a data stream are found to already exist in the chunk store. Stream map 310 provides an efficient metadata container for optimized file metadata (e.g., metadata 314) that may be needed by other modules of a data deduplication system (e.g. a list of hash values used by a file replication module). Stream maps 310 are concise and can be cached in memory for fast access. Chunk store 300 can cache frequently-accessed stream maps 310 (for optimized data streams frequently requested and rehydrated by rehydration module 1102) based on an LRU (least recently used) algorithm or other type of cache algorithm.

C. Example Chunk Store Embodiments that Enable Reliable Locating of Data Chunks

As described above, data chunks may be moved within a chunk container for various reasons, such as due to a defragmentation technique, due to a compaction technique that performs garbage collection, etc. Embodiments are described in this subsection for keeping track of the movement of data chunks within a chunk container.

Figure 12:
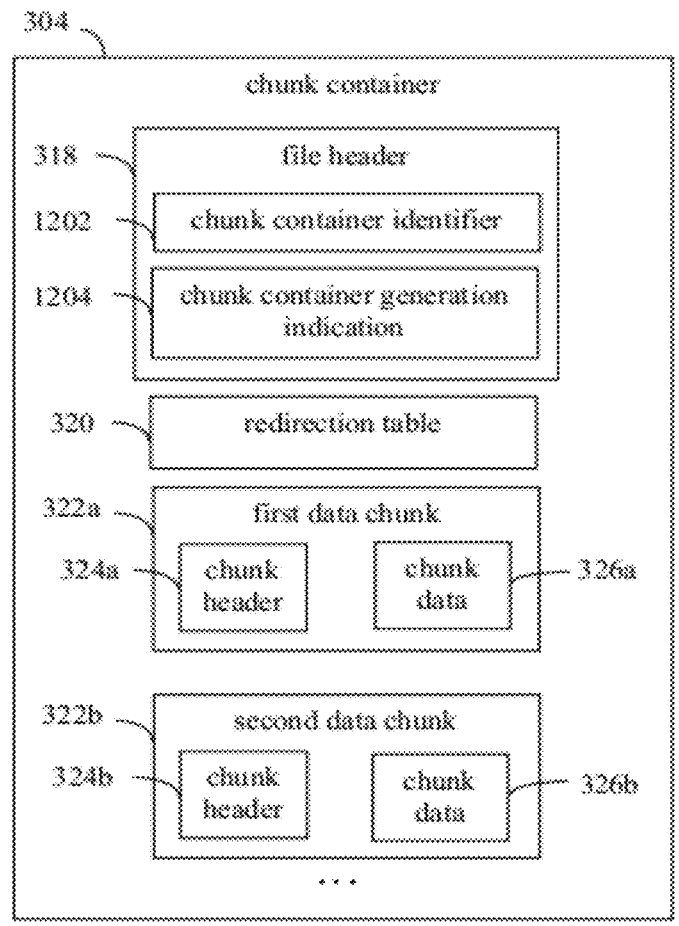
FIG. 12 shows a block diagram of a chunk container, according to an example embodiment.

FIG. 12 shows a block diagram of chunk container 304, according to an example embodiment. As shown in FIG. 12, chunk container 304 is generally similar to chunk container 304 of FIG. 3, with the addition of a chunk container identifier 1202 and a chunk container generation indication 1204 included in file header 318. Chunk container identifier 1202 is a unique identifier (e.g., an identification number) assigned to chunk container 304 to distinguish chunk container 304 from other chunk containers that may be present in chunk store 300. Chunk container generation indication 1204 indicates a revision or generation for chunk container 304. For instance, each time that one or more data chunks 322 are moved within chunk container 304, generation indication 1204 may be modified (e.g., may be incremented to a next generation level, starting from a beginning generation level such as 0 or other beginning value).

In an embodiment, chunk container 304 may identified by a combination of chunk container identifier 1202 and chunk container generation indication 1204 (e.g., may form a file name of chunk container 304). In an embodiment, both of chunk container identifier 1202 and chunk container generation indication 1204 may be integers. Chunk container 304 may have a fixed size (or fixed number of entries), or may have a variable size. For instance, in one example embodiment, each chunk container file that defines a chunk container 304 may be sized to store about 16,000 of chunks, with an average data chunk size of 64 KB, where the size of the chunk container file is set to 1 GB. In other embodiments, a chunk container file may have an alternative size.

Figure 13:
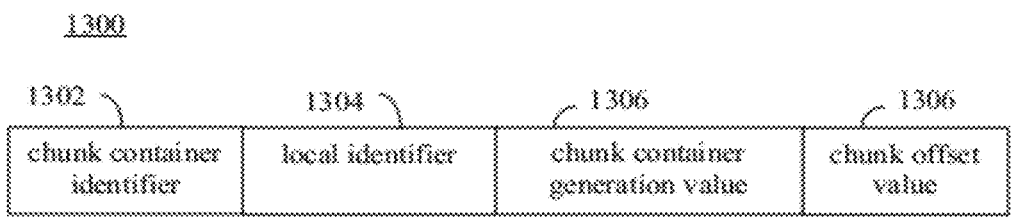
FIG. 13 shows a block diagram of a data chunk identifier, according to an example embodiment.

Data chunks 322 stored in chunk container 304 may be referenced according to data chunk identifier 404 of metadata 400 (FIG. 4) in various ways. For instance, FIG. 13 shows a block diagram of a data chunk identifier 1300, according to an example embodiment. In embodiments, stream maps 310 may store data chunk identifier 1300 in metadata 314 as data chunk identifier 404. As shown in FIG. 13, data chunk identifier 1300 includes a data chunk container identifier 1302, a local identifier 1304, a chunk container generation value 1306, and a chunk offset value 1306. Chunk container identifier 1302 has a value of chunk container identifier 1202 for the chunk container 304 in which the data chunk 322 is stored. Local identifier 1304 is an identifier (e.g., a numerical value) that is assigned to a data chunk 322, and is unique to the assigned data chunk 322 within the chunk container 304 in which the data chunk 322 is stored (e.g., is a unique per-container identifier for the data chunk). Chunk container generation value 1306 has the value of chunk container generation indication 1204 for the chunk container 304 in which the data chunk 322 is stored, at the time the data chunk 322 is stored in the chunk container 304. It is noted that the value assigned to a data chunk 322 for local identifier 1304 is unique for the data chunk 322 over the entire history of the chunk container 304 (e.g., over all generations), and is immutable. Chunk offset value 1306 is an offset of the data chunk 322 in chunk container 304 at the time that the data chunk 322 is added to chunk container 304.

Thus, according to the embodiment of FIG. 13, data chunks 322 may be referenced by stream map 310 by data chunk identifiers 1300, which include chunk offset values 1306 indicating an offset for the data chunks 322 in chunk container 304 when they were stored. However, if a data chunk 322 is subsequently moved in chunk container 304 (i.e., an offset for the data chunk 322 in chunk container 304 changes), an existing data chunk identifier 1300 for the data chunk 322 used in a stream map 310 may have an incorrect value for chunk offset value 1306.

Figure 14:
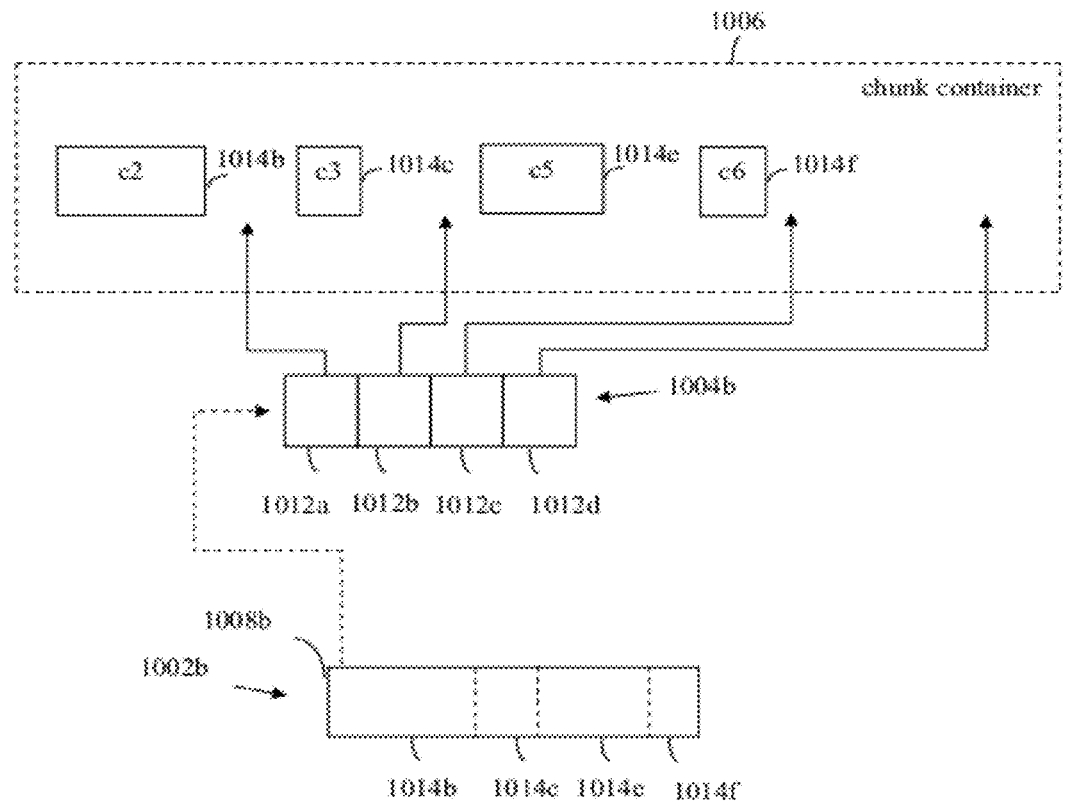
FIG. 14 shows the example of FIG. 10, where data streams are stored in a data store, and further illustrates the effect of the removal of data chunks from the data store, according to an embodiment.

This concept is illustrated in FIG. 14. FIG. 14 shows the example of FIG. 10, where data streams are stored in a data store, and further illustrates the effect of the removal of data chunks from the data store, according to an embodiment. As shown in FIG. 14, similarly to FIG. 10, second data stream 1002*b* has a corresponding stream map 1004*b* (e.g., stored in a stream container 302, not shown in FIG. 14) and has data chunks 1014*b*, 1014*c*, 1014*e*, and 1014*f* stored in chunk container 1006. However, in contrast to FIG. 10, first data stream 1002*a* has been removed from the chunk store. As such, first stream map 1004*a* is no longer present. Furthermore, data chunks 1014*a* and 1014*d*, which were only referenced by stream map 1004*a* in this example, are removed from chunk container 1006 (e.g., by a garbage collection technique). Still further, because data chunks 1014*a* and 1014*d* are no longer present in chunk container 1006, leaving unused space/storage gaps, a compaction algorithm has moved 1014*b*, 1014*c*, 1014*e*, and 1014*f* in chunk container 1006 to reclaim the unused space. As shown in FIG. 14, data chunk 1014*b* has been shifted to a first offset location in chunk container 1006 (where data chunk 1014*a* was previously located, data chunk 1014*c* has been shifted to another offset location to contiguously follow data chunk 1014*b*, data chunk 1014*e* has been shifted to another offset location to contiguously follow data chunk 1014*c*, and data chunk 1014*f* has been shifted to another offset location to contiguously follow data chunk 1014*e* in chunk container 304. In this manner, the storage space in chunk container 304 previously filled by data chunks 1014*a* and 1014*d* may be reclaimed.

However, because data chunks 1014*b*, 1014*c*, 1014*e*, and 1014*f* have moved in chunk container 1006, data chunk identifiers 1012*a*-1012*d* in stream map 1004*b* no longer point to data chunks 1014*b*, 1014*c*, 1014*e*, and 1014*f* (e.g., the arrows representing pointers 1012*a*-1012*d* are shown pointed at the prior positions for data chunks 1014*b*, 1014*c*, 1014*e*, and 1014*f*). If stream map 1004*b* is used in an attempt to rehydrate data stream 1002*b*, the attempt will fail because data chunks 1014*b*, 1014*c*, 1014*e*, and 1014*f* are not retrievable at their prior locations. As such, it is desired to have a technique for locating data chunks 1014*b*, 1014*c*, 1014*e*, and 1014*f* at their new offsets.

In an embodiment, a chunk store may implement a reliable chunk locator that may be used to track data chunks that have moved. In contrast to conventional techniques, the reliable chunk locator does not use an index for mapping data chunk identifiers to a physical chunk location. Conventional techniques use an index that maps chunk identifiers to the chunk data physical location. The scale of storage systems (e.g., 100 s of Terabytes or greater) and an average chunk size (e.g. 64 KB) make such an index to be very large. If such an index is fully loaded in memory it will consume a large amount of the available memory and processor resources. If the index is not loaded in memory, data accesses become slow because the index needs to be paged into memory. Embodiments described herein do not use such an index, thereby preserving system resources.

In an embodiment, the reliable chunk locator is implemented in the form of a redirection table, such as redirection table 320 of chunk container 304 in FIG. 3. The redirection table may store one or more entries for data chunks 322 that have been moved in chunk container 304. Each entry identifies a moved data chunk 322, and has a data chunk offset value indicating the location of the data chunk 322 in chunk container 304 at its new location. The redirection table may be referenced during rehydration of a data stream to locate any data chunks of the data stream that have moved.

Figure 15:
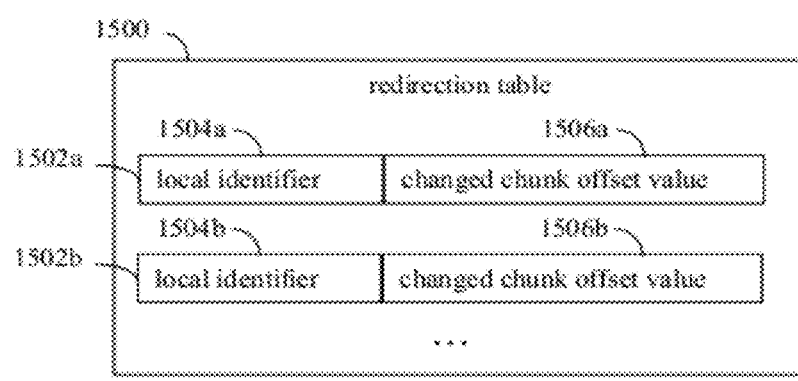
FIG. 15 shows a block diagram of a redirection table, according to an example embodiment.

For instance, FIG. 15 shows a block diagram of a redirection table 1500, according to an example embodiment. Redirection table 1500 is used to locate data chunks 322 (including stream maps stored as data chunks) if the data chunks 322 are moved within chunk container 304. For instance, redirection table 1500 enables data chunks 322 to be moved within chunk container 304 for space reclamation as part of a garbage collection and compaction process, and to still be reliably locatable based on the original chunk identifiers of the data chunks 322. As shown in FIG. 15, redirection table 1500 includes a plurality of entries 1502, such as a first entry 1502*a* and a second entry 1502*b*. Any number of entries 1502 may be included in redirection table 1500, including hundreds, thousands, and even greater numbers of entries 1502. Each entry 1502 includes a local identifier 1504 and a changed chunk offset value 1506. For instance, first entry 1502*a* includes a first local identifier 1504*a* and a first changed chunk offset value 1506*a*, and second entry 1502*b* includes a second local identifier 1504*b* and a second changed chunk offset value 1506*b*.

Local identifier 1504 is the unique local identifier assigned to a data chunk 322 when originally stored in chunk container 304 (local identifier 1304 of FIG. 13). Changed chunk offset value 1506 is the new chunk offset value for the data chunk 322 having the corresponding local identifier 1504 that was moved. As such, redirection table 1500 may be accessed using a locality indicator for a data chunk to determine a changed chunk offset value for the data chunk.

For example, local identifier 1504*a* in FIG. 15 may be the local identifier assigned to data chunk 1014*b* in FIG. 14. Entry 1502*a* of redirection table 1500 may be accessed using the local identifier assigned to data chunk 1014*b* to determine changed chunk offset value 1506*a*, which indicates a new location for data chunk 1014*b* in chunk container 304.

Note that redirection table 1500 may have any size. For instance, in an embodiment, the size of redirection table 11500 may be bounded by (a predetermined maximum number of data chunks–a predetermined minimum number of data chunks deleted for compaction)×(a size of a redirection table entry). In some cases, relocations of data chunks may be infrequent. In an embodiment, after determining a changed chunk offset value for a data chunk, any pointers to the data chunk from stream maps can be modified in the stream maps to the changed chunk offset value, and the entry 1502 may be removed from redirection table 1500. In some situations, redirection table 1500 may be emptied of entries 1502 in this manner over time.

Figure 16:
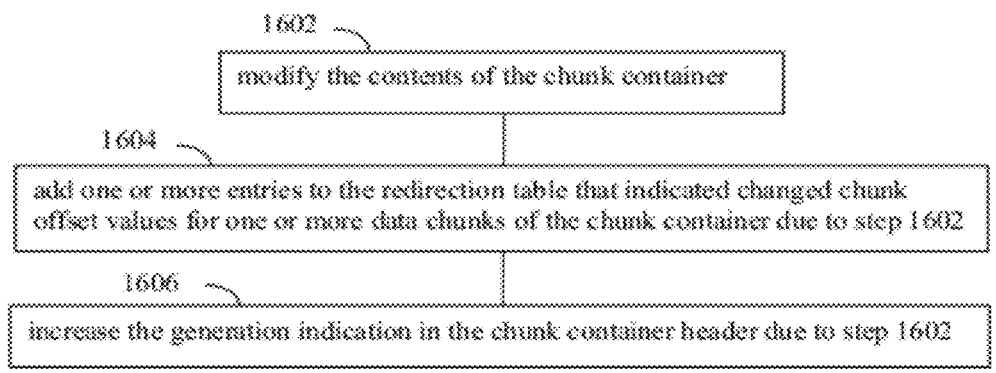
FIG. 16 shows a flowchart for storing a data stream, according to an example embodiment.
Figure 17:
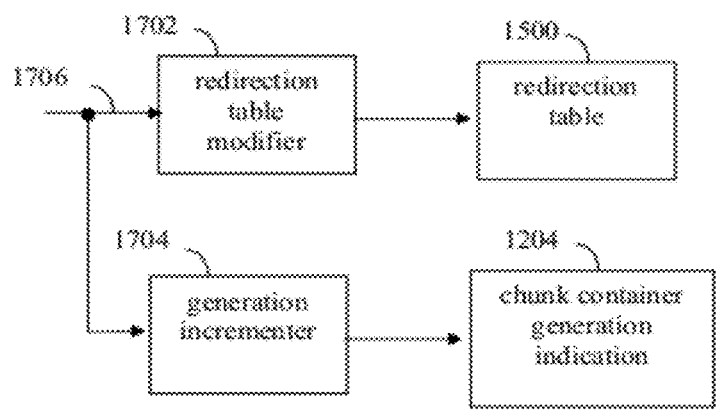
FIG. 17 shows a block diagram of a data chunk redirection system, according to an example embodiment.

Entries to a redirection tables may be added in various ways. For instance, FIG. 16 shows a flowchart 1600 for storing a data stream, according to an example embodiment. Flowchart 1600 is described as follows with reference to FIG. 17. FIG. 17 shows a block diagram of a data chunk redirection system 1700, according to an example embodiment. As shown in FIG. 17, data chunk redirection system 1700 includes a redirection table modifier 1702 and a generation incrementer 1704. For instance, in an embodiment, data chunk redirection system 1700 may be implemented in chunk store interface 116 of FIG. 1. Further structural and operational embodiments will be apparent to persons skilled in the relevant art(s) based on the discussion regarding flowchart 1600. Flowchart 1600 is described as follows.

Flowchart 1600 begins with step 1602. In step 1602, the contents of the chunk container are modified. For example, in an embodiment, one or more data chunks 322 in chunk container 304 of FIG. 12 may be moved. Such data chunks 322 may be moved by a maintenance task (e.g., maintenance module 106 in FIG. 1), such as a defragmentation process, a compaction process after garbage collection, or other process.

In step 1604, one or more entries are added to the redirection table that indicated changed chunk offset values for one or more data chunks of the chunk container due to step 1602. For example, as shown in FIG. 17, redirection table modifier 1702 receives moved data chunks indication 1706, which indicates one or more data chunks 322 moved in chunk container 304 of FIG. 12 according to the maintenance task of step 1602. Moved data chunks indication 1706 may be received from the maintenance task that performed step 1602, and may indicate the chunk container identifier for chunk container 304, each moved data chunk (e.g., by local identifier 1304), and the offset of the moved data chunk in chunk container 304. Redirection table modifier 1702 is configured to add one or more entries 1502 to redirection table 1500 that correspond to the one or more moved data chunks 322 indicated in moved data chunks indication 1706. For example, for each moved data chunk 322, redirection table modifier 1702 generates an entry 1502 that indicates the local identifier value of the moved data chunk 322 as local identifier 1504, and indicates the new offset value of the moved data chunk 322 as changed chunk offset value 1506.

In step 1606, the generation indication in the chunk container header is increased due to step 1602. For example, as shown in FIG. 17, generation incrementer 1704 receives moved data chunks indication 1706, which indicates that data chunks have been moved in chunk container 304 of FIG. 12, as identified by the chunk container identifier received in moved data chunks indication 1706. As such, generation incrementer 1704 modifies chunk container generation indication 1204 of chunk container 304. For example, in an embodiment, chunk container generation indication 1204 may have an initial value of 0, and each time data chunks 322 are moved in chunk container 304, chunk container generation indication 1204 may be incremented to indicate a higher generation value. In other embodiments, chunk container generation indication 1204 may be modified in other ways.

As such, when a data chunk 322 of chunk container 304 of FIG. 12 is looked up using the data chunk identifier—data chunk identifier 1300 of FIG. 13—stored in the referencing stream map 310, chunk container generation indication 1204 of chunk container 304 may be checked to see if the current generation of chunk container 304 is the same as chunk container generation value 1306 of data chunk identifier 1300. If they are the same, the data chunk 322 can be located at the offset indicated by chunk offset value 1306 in data chunk identifier 1300. If not, redirection table 1500 is read to determine the changed offset value of the data chunk 322 in chunk container 304.

Figure 18:
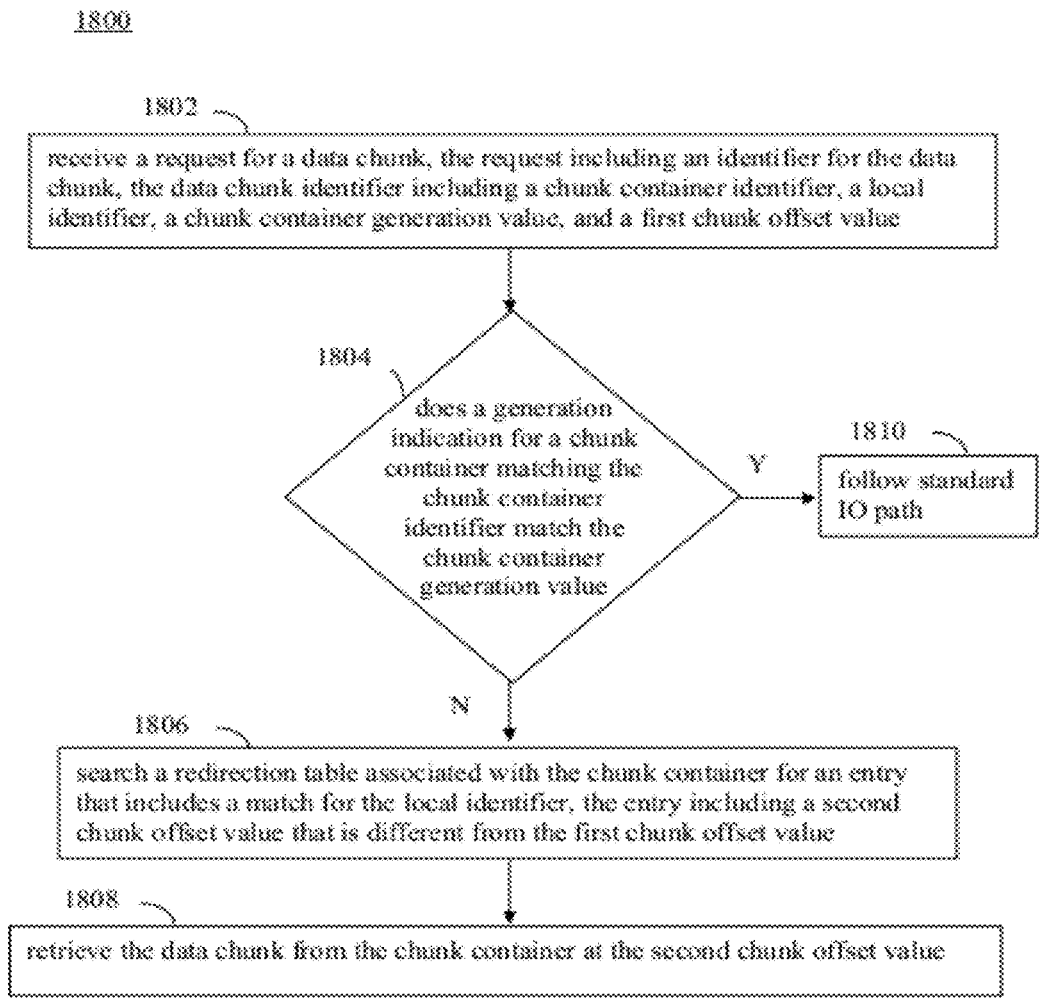
FIG. 18 shows a flowchart for locating data chunks in a chunk container, according to an example embodiment.
Figure 19:
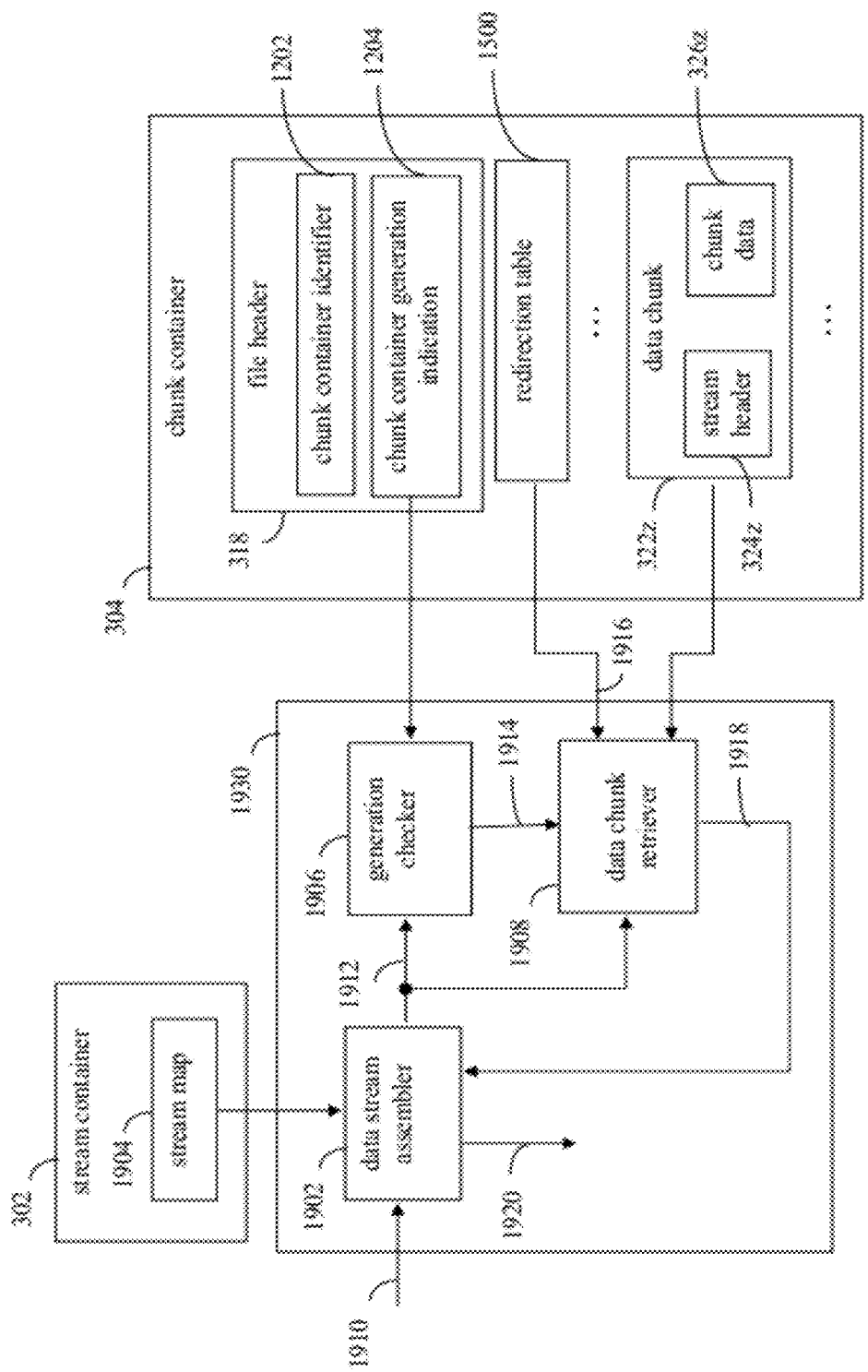
FIG. 19 shows a block diagram of a rehydration module that accesses a chunk store to rehydrate a data stream, according to an example embodiment.

For instance, FIG. 18 shows a flowchart 1800 for locating data chunks in a chunk container, according to an example embodiment. For example, flowchart 1800 may be performed by rehydration module 1102 of FIG. 11 when rehydrating a data stream from a stream map. Flowchart 1800 is described as follows with reference to FIG. 19. FIG. 19 shows a block diagram of a rehydration module 1930 that communicates with stream container 302 and chunk container 304 to rehydrate a data stream according to a data stream request 1910, according to an example embodiment. As shown in FIG. 19, rehydration module 1930 includes a data stream assembler 1902, a generation checker 1906, and a data chunk retriever 1908. Further structural and operational embodiments will be apparent to persons skilled in the relevant art(s) based on the discussion regarding flowchart 1800. Flowchart 1800 and FIG. 19 are described as follows.

In FIG. 19, data stream assembler 1902 receives data stream request 1910, which indicates a stream map, such as stream map 1904 stored in stream container 302, corresponding to a data stream to be rehydrated. Data stream assembler 1902 processes stream map 1904, generating a data chunk request 1912 for each data chunk referenced by stream map 1904.

Flowchart 1800 begins with step 1802. In step 1802, a request for a data chunk is received, the request including an identifier for the data chunk, the data chunk identifier including a chunk container identifier, a local identifier, a chunk container generation value, and a first chunk offset value. For example, in an embodiment, data chunk request 1912 generated by data stream assembler 1902 may include data chunk identifier 1300 of FIG. 13 to identify a requested data chunk 322. As shown in FIG. 13, data chunk identifier 1300 may include a chunk container identifier 1302, a local identifier 1304, a chunk container generation value 1306, and a chunk offset value 1306 for the requested data chunk 322. A chunk container is located that has a chunk container identifier 1202 matching chunk container identifier 1302 of data chunk identifier 1300. For instance, the located chunk container may be chunk container 304 in FIG. 3. The located chunk container is accessed as follows to retrieve requested data chunks. Operation proceeds to step 1804.

In step 1804, whether a generation indication for a chunk container matching the chunk container identifier matches the chunk container generation value is determined. For example, as shown in FIG. 19, generation checker 1906 receives data chunk request 1912 for the requested data chunk. Generation checker 1906 accesses chunk container 304 (identified above as having a chunk container identifier 1202 that matches chunk container identifier 1302 of the requested data chunk 322). Generation checker 1906 is configured to compare chunk container generation indication 1204 for chunk container 304 to chunk container generation value 1306 for requested data chunk 322, and to output a generation match indication 1914. If their values do not match (e.g., the value of chunk container generation indication 1204 is greater than the value of chunk container generation value 1306 for requested data chunk 322), generation match indication 1914 indicates that a match was not found, and operation proceeds to step 1806. If their values do match, generation match indication 1914 indicates that a match was found, and operation proceeds to step 1810, where a standard I/O path (or other path) for retrieving the requested data chunk may be followed.

In step 1806, a redirection table associated with the chunk container is searched for an entry that includes a match for the local identifier, the entry including a second chunk offset value that is different from the first chunk offset value. For example, as shown in FIG. 19, data chunk retriever 1908 receives generation match indication 1914 and data chunk request 1912. If generation match indication 1914 indicates that a match was not found in step 1804, data chunk retriever 1908 accesses redirection table 1500 for a changed chunk offset value 1506 (FIG. 15) in an entry 1502 having a local identifier 1504 that matches local identifier 1304 of the requested data chunk 322. As shown in FIG. 19, data chunk retriever 1908 receives a second chunk offset value 1916 that is different from the first chunk offset value of chunk offset value 1306. Operation proceeds to step 1808.

In step 1808, the data chunk is retrieved from the chunk container at the second chunk offset value. For example, as shown in FIG. 19, data chunk retriever 1908 accesses chunk container 304 for a data chunk 322z located at second chunk offset value 1916. Data chunk 322z is the requested data chunk 322, having been moved in chunk container 304 from chunk offset value 1306 to second chunk offset value 1916.

As shown in FIG. 19, data chunk retriever 1908 outputs data chunk 1918, which is data chunk 322z in the current example. Data chunk 1918 is received by data stream assembler 1902. In this manner, data stream assembler 1902 receives all data chunks 322 referenced by stream map 1904 from data chunk retriever 1908, retrieved either directly from chunk container 304 according to the corresponding chunk offset value 1306, or from chunk container 304 as redirected by redirection table 1500. As shown in FIG. 19, data stream assembler 1902 generates a data stream 1920, which is the rehydrated form of the requested data stream indicated in data stream request 1910. Data stream assembler 1902 assembles together all of the received data chunks 322 as described elsewhere herein to form data stream 1920.

It is noted that the stream map reference identifier that resides in the reparse point of a data stream (e.g., stream link 1008a or 1008b in FIG. 10) may have the same structure as data chunk identifier 1300 of FIG. 13. As described above, a stream map 310 may have the form of a data chunk 322 that contains stream map metadata rather than end-user file data. As such, the procedure for addressing a stream map 310 may be the same as addressing a data chunk 322—both techniques may use the data chunk identifier 1300 structure. An optimized data stream references a stream map 310 by placing the data chunk identifier 1300 of the stream map 310 at the file reparse point (attached to the actual data stream/file object). The stream map identifier contains the [Container identifier, local identifier, generation value, offset value] information that may be used to locate (either directly, or through a redirection table) the stream map 310 data chunk inside stream container 302. As such, in an embodiment, a format and layout of a stream container 302 may be essentially the same as that of a chunk container 304.

D. Example Chunk Store Defragmentation Embodiments

Locality is a factor in optimized data access latency, where data chunks associated with a particular data stream can be accessed more rapidly if they are sequentially located. As described above, data de-duplication introduces fragmentation as the data stream is split into data chunks. A common data access pattern is a sequential I/O operation. Sequential I/O may be performed when an application reads an entire file from storage into memory, rehydrating the file in the process. Any fragmentation in the file in storage will lead to disk seeks in the sequential I/O operation, which reduces I/O throughput and therefore increases rehydration latency. In addition, the extra disk seeks add a load on the disk resource. If the disk used by the chunk store is shared with other data, this extra load on the disk will slow I/O operations with regard to this other data as well.

This subsection provides various defragmentation embodiments that enable improved data chunk locality and reduced fragmentation. Some embodiments may settle on a tradeoff between the level of data deduplication and the level of fragmentation to enable less latency on data access. For instance, in one embodiment, fragmentation in a chunk store is reduced by increasing the number and/or length of contiguous chunks sequences. A "contiguous chunk sequence" is a set of contiguously stored data chunks that represent a data segment of one or more optimized data streams. In another embodiment, an order of data chunks stored in a chunk store may be reorganized such that stored data streams that are more likely to be accessed have data chunks that are stored contiguously at the expense of lower priority stored data streams. Such embodiments may decrease fragmentation and/or may prioritize defragmentation based on the likelihood of rehydration.

Figure 20:
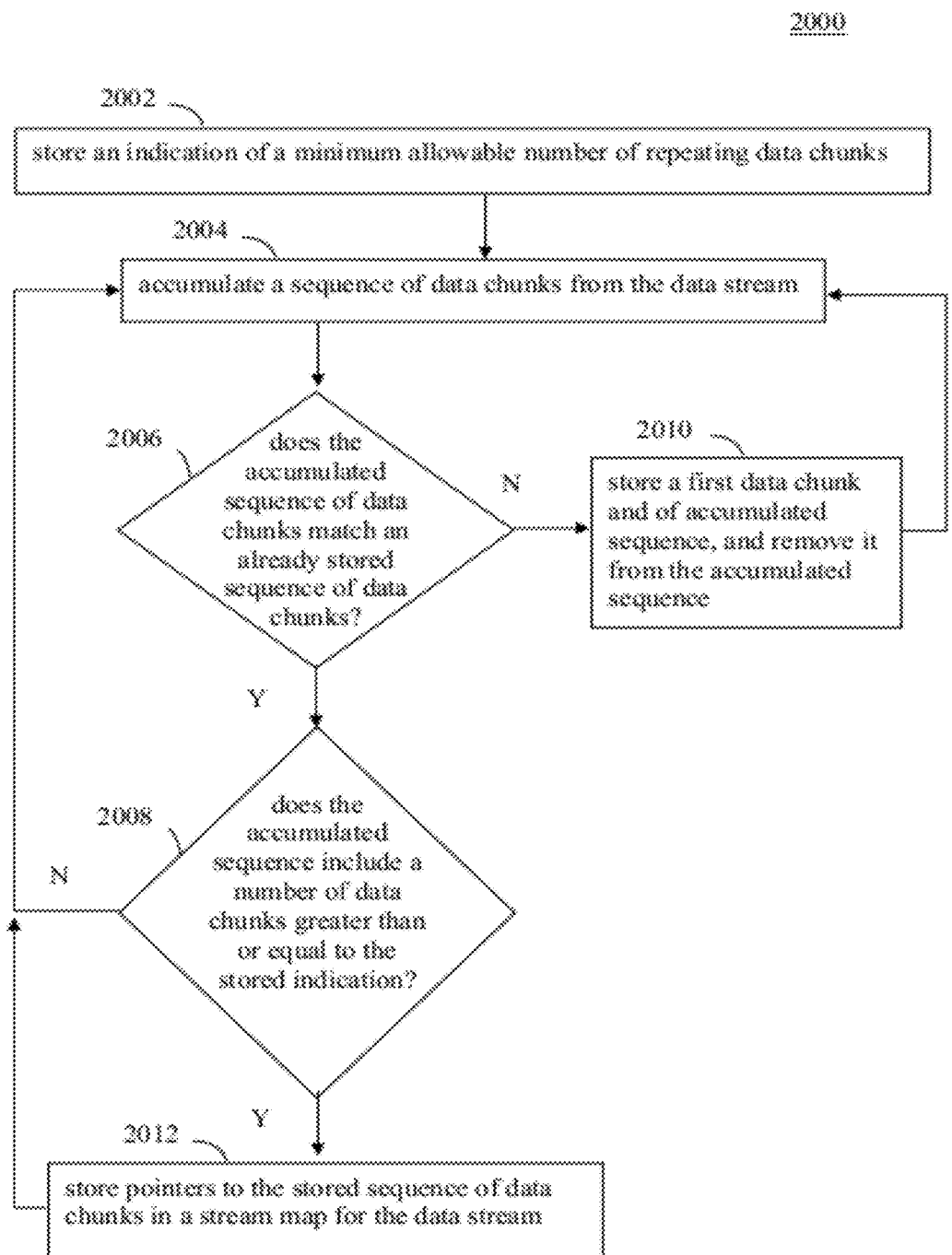
FIG. 20 shows a flowchart for storing a data stream, according to an example embodiment.
Figure 21:
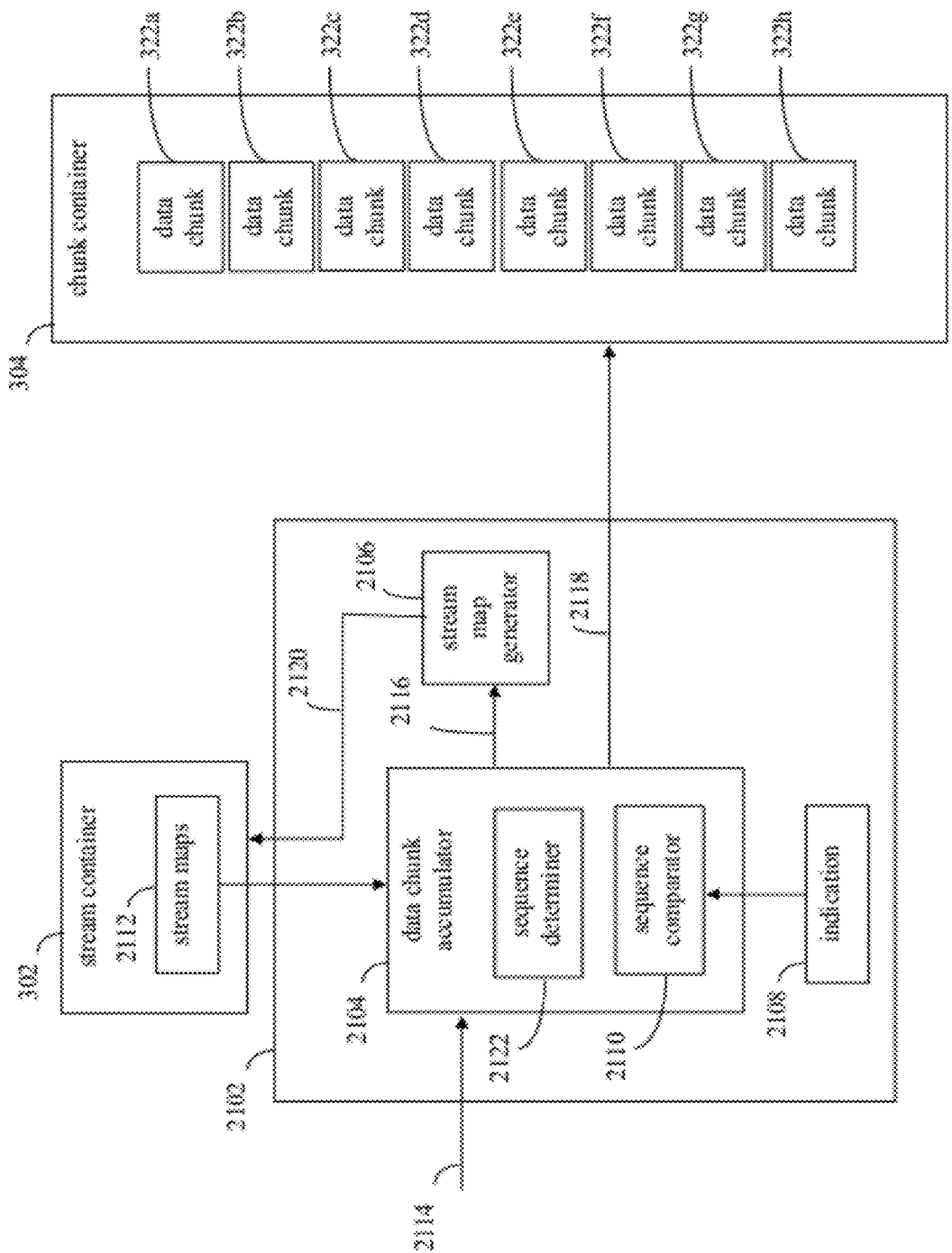
FIG. 21 shows a block diagram of a data stream storage system used to store data streams in an optimized form in a chunk store, according to an example embodiment.

For instance, FIG. 20 shows a flowchart 2000 for storing a data stream, according to an example embodiment. Flowchart 2000 is described with reference to FIG. 21, for purposes of illustration. FIG. 21 shows a block diagram of a data stream storage system 2102 used to store data streams in an optimized form in stream container 302 and chunk container 304, according to an example embodiment. In an embodiment, system 2102 may operate according to flowchart 2000. As shown in FIG. 21, data stream storage system 2102 includes a data chunk accumulator 2104 and a stream map generator 2106. For instance, in an embodiment, data stream storage system 2102 may be implemented in chunk store interface 116 of FIG. 1. Further structural and operational embodiments will be apparent to persons skilled in the relevant art(s) based on the discussion regarding flowchart 2000. Flowchart 2000 and system 2102 are described as follows.

Flowchart 2000 begins with step 2002. In step 2002, an indication of a minimum allowable number of repeating data chunks is stored. For example, as shown in FIG. 21, an indication 2108 is stored in system 2102. Indication 2108 is an indication of a minimum allowable number of repeating data chunks that can be stored in chunk container 304. The value of indication 2108 may be provided by a user, may be calculated according to an algorithm, or may be set or determined in other way. Indication 2108 may be pre-set prior to optimizing data streams according to flowchart 2000, and may be changed as desired. In an embodiment, indication 2108 may be stored in any type of storage, including in memory, a hard disk drive, and/or other type of storage mentioned elsewhere herein or otherwise known. For instance, indication 2108 may be an integer larger than one. According to the value of indication 2108 (e.g., a value of "N"), a data stream must have a "contiguous chunk sequence" of at least N data chunks that repeat those of a previously stored file, or the data chunks of the data chunk sequence will not be optimized. Operation proceeds from step 2002 to step 2004.

In step 2004, a sequence of data chunks is accumulated from the data stream. For example, as shown in FIG. 21, data chunk accumulator 2104 receives data chunks 2114 (e.g., data chunks 124 of FIG. 1) that is a sequence of data chunks from a data stream. Data chunk accumulator 2104 accumulates data chunks 2114 in sequence. Data chunk accumulator 2104 may accumulate the received data chunks in memory or other storage. Operation proceeds from step 2004 to step 2006.

In step 2006, whether the accumulated sequence of data chunks matches an already stored sequence of data chunks is determined, the stored sequence of data chunks being stored contiguously in the chunk container. For example, as shown in FIG. 21, data chunk accumulator 2104 includes a sequence determiner 2122. Sequence determiner 2122 is configured to compare the data chunk sequence accumulated by data chunk accumulator 2104 to sequences of data chunks that are already stored in chunk container 304 in a contiguous manner (e.g., duplicate sequences of data chunks). For example, as shown in FIG. 21, data chunk accumulator 2104 receives stream maps 2112 from stream container 302. Stream maps 2112 includes the stream maps for data streams having data chunks stored in chunk container 304. Sequence determiner 2122 may receive stream maps 2112, and may use the metadata of stream maps 2112 to determine contiguously stored sequences of data chunks in chunk container 304. For example, sequence determiner 2122 may determine contiguously stored data chunk sequences as those data chunks referenced in stream maps 2112 that have the same value for locality indicator 406 (FIG. 4). In other embodiments, sequence determiner 2122 may use other techniques for determining contiguously stored sequences of data chunks in chunk container 304. If a sequence of data chunks accumulated by data chunk accumulator 2104 matches (is a duplicate of) a sequence of data chunks referenced by a stream map 2112 that have the same locality indicator 406, sequence determiner 2122 indicates that a match is determined, and operation proceeds from step 2006 to step 2008. Otherwise, sequence determiner 2122 indicates that a match is not found, and operation proceeds to step 2010.

In step 2008, whether the accumulated sequence includes a number of data chunks that is greater than or equal to the stored indication is determined. For example, as shown in FIG. 21, data chunk accumulator 2104 includes a sequence comparator 2110. Sequence comparator 2110 receives indication 2108 (e.g., from storage), and receives the accumulated sequence of data chunks from data chunk accumulator 2104. If the accumulated sequence of data chunks includes a number of data chunks that is greater than or equal to indication 2108, operation proceeds from step 2008 to step 2012. Otherwise, operation proceeds back to step 2004, where a next data chunk is accumulated by data chunk accumulator 2104 from data chunks 2114 (e.g., as a "last in" data chunk).

In step 2010, a first data chunk of the accumulated sequence is stored and is removed from the accumulated sequence. For example, referring to FIG. 21, data chunk accumulator 2104 may store a first data chunk of the accumulated sequence of data chunks (e.g., a "first in" data chunk) in chunk container 304 as data chunk 2118 after the currently last data chunk 322 stored in chunk container 304 (e.g., after data chunk 322h in the example of FIG. 21). Data chunk 2118 is removed from the accumulated sequence in data chunk accumulator 2104. Operation proceeds to step 2004 from step 2010, where a next data chunk is accumulated by data chunk accumulator 2104 from data chunks 2114 (e.g., as a "last in" data chunk).

In step 2012, pointers to the stored sequence of data chunks are stored in a stream map for the data stream. For example, as shown in FIG. 21, data chunk accumulator 2104 may generate a store pointers indication 2116 for the current accumulated sequence of data chunks. Store pointers indication 2116 is received by stream map generator 2106. Stream map generator 2106 is configured to generate a stream map 2120 corresponding to the data stream of data chunks 2114. Store pointers indication 2116 instructs stream map generator 2106 to store a pointer (e.g., data chunk identifier 404) for each of the data chunks of the accumulated sequence of data chunks in stream map 2120, to refer to the already stored sequence of data chunks that was determined to match the accumulated sequence. Stream map generator 2106 may generate the pointers in any manner, including as described elsewhere herein (e.g., stream map generator 2106 may include metadata generator 606 of FIG. 6). The accumulated sequence of data chunks is removed from data chunk accumulator 2104, and operation proceeds from step 2012 to step 2004, where a next data chunk is accumulated by data chunk accumulator 2104 from data chunks 2114.

It is noted that with respect to step 2010, where data chunk 2118 is stored in chunk container 304, data chunk accumulator 2104 generates store pointers indication 2116 to instruct stream map generator 2106 to store a pointer to data chunk 2118 in stream map 2120. Furthermore, it is noted that flowchart 2000 may continue until no more data chunks are received in data chunks 2114. In this case, stream map generator 2106 may complete generation of stream map 2120, and may store stream map 2120 in stream container 302.

For instance, in one example, the minimum allowable number of repeating data chunks indication 2108 may be 5. Data chunk accumulator 2104 may accumulate four data chunks that duplicate (match) a stored sequence of four data chunks (as determined by sequence determiner 2122 in step 2006). However, sequence comparator 2110 determines (in step 2008) that the number of four data chunks is less than the value of indication 2108. Data chunk accumulator 2104 accumulates a fifth data chunk (in step 2004). If sequence determiner 2122 determines (in step 2006) that the five accumulated data chunks duplicate a stored sequence of five data chunks, sequence comparator 2110 determines (in step 2008) that the number of five data chunks is equal to the value of indication 2108, and the five accumulated data chunks are optimized according to step 2012 (e.g., pointers to the stored sequence of data chunks are used in the stream map generated by stream map generator 2106 for the five accumulated data chunks). If sequence determiner 2122 had determined (in step 2006) that the five accumulated data chunks did not match the stored sequence of five data chunks, the first or "oldest" data chunk is shifted out, and a new data chunk is accumulated (in step 2004).

Note that example of flowchart 2000 is provided as an example embodiment. In another embodiment, the "N size contiguous set" may be adhered to, such that a sequence of N chunks in a new data stream would be forced before trying to match a full sequence with another data stream. Furthermore, if system 2102 of FIG. 21 stores a data chunk that was already stored in chunk container 304 due to defragmentation, system 2102 may report this change to a caller with a new chunk identifier. In contrast, solutions that use a hash index may decide to update the index with another instance of the same chunk.

According to the embodiments of FIGS. 20 and 21, if N contiguous data chunks of a second data stream are repeating data chunks of a first stream, then the data chunks of the first data stream are optimized, and the stream map generated for the first data stream will reference the data chunks of the second data stream. When rehydration of a data stream stored in this manner is performed, the disk seeks that are performed are reduced to those performed for (N×data chunk-size) sequences rather than for single chunk-size sequences, and a maximum fragmentation is 1/N of a default algorithm. At the same time, a data deduplication rate is lower because data chunks are not optimized, and instead duplicate data chunks are stored for them, if their duplication does not adhere to the N contiguous chunks condition.

Figure 22:
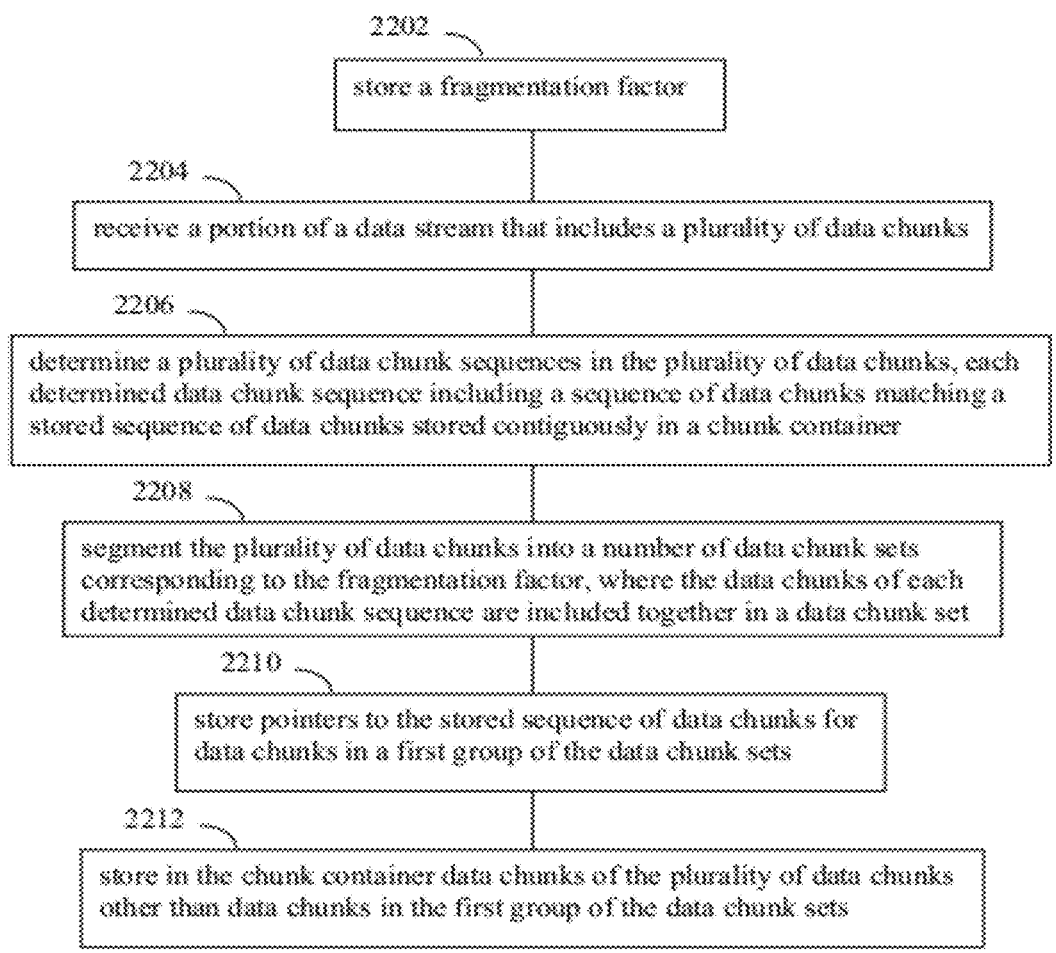
FIG. 22 shows a flowchart for storing a data stream, according to another example embodiment.
Figure 23:
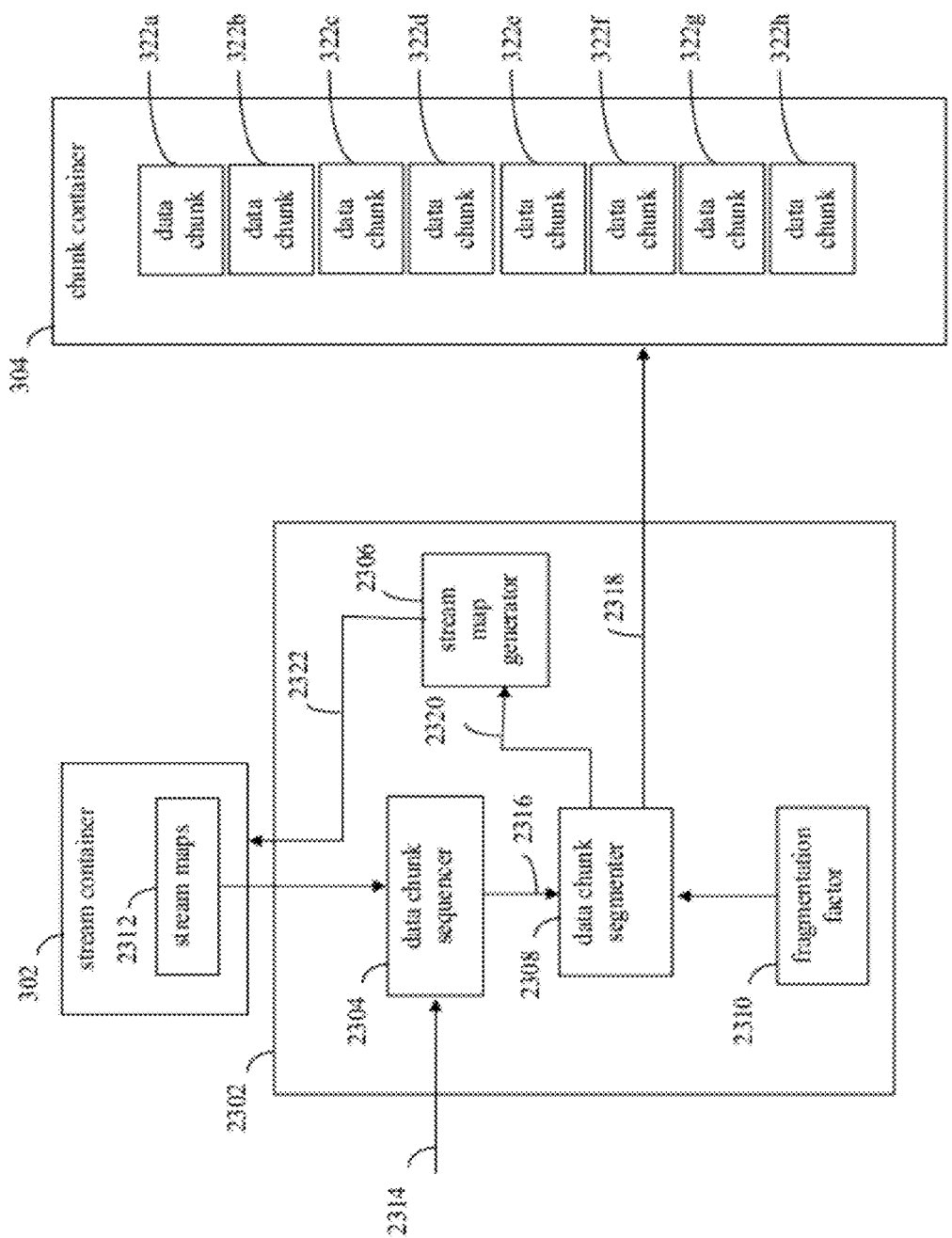
FIG. 23 shows a block diagram of a data stream storage system used to store data streams in an optimized form in a chunk store, according to an example embodiment.

FIG. 22 shows a flowchart 2200 for storing a data stream, according to another example embodiment. Flowchart 2200 is described with reference to FIG. 23, for purposes of illustration. FIG. 23 shows a block diagram of a data stream storage system 2302 used to store data streams in an optimized form in stream container 302 and chunk container 304, according to an example embodiment. In an embodiment, system 2302 may operate according to flowchart 2200. As shown in FIG. 23, data stream storage system 2302 includes a data chunk sequencer 2304, a stream map generator 2306, and a data chunk segmenter 2308. For instance, in an embodiment, data stream storage system 2302 may be implemented in chunk store interface 116 of FIG. 1. Further structural and operational embodiments will be apparent to persons skilled in the relevant art(s) based on the discussion regarding flowchart 2200. Flowchart 2200 and system 2302 are described as follows.

Flowchart 2200 begins with step 2202. In step 2202, a fragmentation factor is stored. For example, as shown in FIG. 23, a fragmentation factor 2310 is stored in system 2302. Fragmentation factor 2310 is an indication of a maximum amount of fragmentation to be allowed for a designated portion of a received data stream 2314. The value of fragmentation factor 2310 may be provided by a user, may be calculated according to an algorithm, or may be set or determined in other way. Fragmentation factor 2310 may be pre-set prior to optimizing data streams according to flowchart 2200, and may be changed as desired. In an embodiment, fragmentation factor 2310 may be stored in any type of storage, including in memory, a hard disk drive, and/or other type of storage mentioned elsewhere herein or otherwise known. For instance, fragmentation factor 2310 may be an integer larger than one. For instance, in one example, fragmentation factor 2310 may be define as 3 fragmentation sets for every 1 MB of optimized data, or may have other value.

In step 2204, a portion of a data stream that includes a plurality of data chunks is received. For example, as shown in FIG. 23, data chunk sequencer 2304 receives data stream 2314. Data chunk sequencer 2304 may receive a portion of data stream 2314 for processing. Any portion size of data stream 2314 may be received, including 1 MB, a larger portion size, or a smaller portion size.

In one example provided for purposes of illustration, data chunk sequencer 2304 may receive a 1 MB portion of data stream 2314 that includes 16 data chunks (having an average data chunk size of about 64 KB).

In step 2206, a plurality of data chunk sequences in the plurality of data chunks is determined, with each determined data chunk sequence including a sequence of data chunks matching a stored sequence of data chunks stored contiguously in a chunk container. For instance, data chunk sequencer 2304 may be configured to analyze the received portion of data stream 2314 to determine one or more data chunk sequences therein that match stored sequences of data chunks in chunk container 304. For example, as shown in FIG. 23, data chunk sequencer 2304 receives stream maps 2312 from stream container 302. Stream maps 2312 includes the stream maps for data streams having data chunks stored in chunk container 304. Data chunk sequencer 2304 may receive stream maps 2312, and may use the metadata of stream maps 2312 to determine contiguously stored sequences of data chunks in chunk container 304. For example, data chunk sequencer 2304 may determine contiguously stored data chunk sequences as those data chunks referenced in stream maps 2312 that have the same value for locality indicator 406 (FIG. 4). In other embodiments, data chunk sequencer 2304 may use other techniques for determining contiguously stored sequences of data chunks in chunk container 304. As shown in FIG. 23, data chunk sequencer 2304 outputs sequenced data chunks 2316, which indicates all data chunks included in the received portion of data stream 2314, and indicates which data chunks are included in data chunk sequences.

For instance, continuing the above example, three data chunk sequences may be determined in the 16 received data chunks: Data chunks 1-5 may be non-unique, matching a contiguous sequence of five stored data chunks associated with a second data stream; data chunk 6 may be unique; data chunks 7-8 may be non-unique, matching a contiguous sequence of two stored data chunks associated with a third data stream; data chunk 9 may be unique; and data chunks 10-16 may be non-unique, matching a contiguous sequence of seven stored data chunks associated with a fourth data stream.

In step 2208, the plurality of data chunks is segmented into a number of data chunk sets corresponding to the fragmentation factor, where the data chunks of each determined data chunk sequence are included together in a data chunk set. For instance, as shown in FIG. 23, data chunk segmenter 2308 receives sequenced data chunks 2316. Data chunk segmenter 2308 is configured to segment sequenced data chunks 2316 in a number of data chunk sets corresponding to fragmentation factor 2310, such as a number of data chunk sets less than or equal to the value of fragmentation factor 2310. In an embodiment, data chunk segmenter 2308 may be configured to segment sequenced data chunks 2316 in a manner that achieves improved and/or maximum data deduplication (e.g., to minimize a number of storage seeks used to rehydrate the corresponding data stream).

For instance, in one embodiment, data chunk segmenter 2308 may be configured to segment sequenced data chunks 2316 such that one or more of the data chunk sets each only include data chunk sequences (e.g., only include data chunks included in the data chunk sequences determined by data chunk sequencer 2304), and that the remaining data chunk sets each include unique data chunks, or include a combination of unique data chunks and data chunk sequences. The data chunk sequences selected to be included in the data chunk sets that only include data chunk sequences may be selected because they are the longest data chunk sequences, and/or based on other factors.

For instance, continuing the above example, fragmentation factor 2310 may have a value of three. In such an example, data chunks 1-5 (corresponding to a data chunk sequence of the second data stream) may be included in a first data chunk set, data chunks 6-9 (including unique chunk 6, data chunks 7 and 8 that correspond to a data chunk sequence of the third data stream, and unique chunk 8) may be included in a second data chunk set, and data chunks 10-16 (corresponding to a data chunk sequence of the fourth data stream) may be included in a third data chunk set. In this example, the first and third data chunk sets include only data chunk sequences (data chunks 1-5 and 10-16), and the second data chunk set includes a combination of unique data chunks (data chunks 6 and 9) and a data chunk sequence (data chunks 7-8). Thus, the two longest data chunk sequences (data chunks 1-5 and data chunks 10-16) are each included in their own data chunk set.

In step 2210, pointers to the stored sequence of data chunks are stored for data chunks in a first group of the data chunk sets. For example, in an embodiment, the data chunk sets designated by data chunk segmenter 2308 may be separated into two groups: a first group of data chunk sets that only include data chunk sequences, and a second group of data chunk sets that only include unique data chunks or include combinations of unique data chunks and data chunk sequences. The first group of data chunk sets is to be handled as duplicates, meaning that instead of actually storing the first group in chunk container 304, the first group will be stored as pointers to the already stored matching data chunks. Furthermore, the second group of data chunks sets is to be stored in chunk container 304 as contiguous new data chunks. Data chunks of the second group that are duplicates to data chunks already stored in chunk container 304 are still stored in chunk container 304, resulting in excess "deduplication lost" data chunks, but aiding in reducing fragmentation.

As shown in FIG. 23, data chunk segmenter 2308 may generate a store pointers indication 2320 for the first group of data chunk sets. Store pointers indication 2320 is received by stream map generator 2306. Stream map generator 2306 is configured to generate a stream map 2322 corresponding to the data stream of data chunks 2314. Store pointers indication 2320 instructs stream map generator 2306 to store a pointer (e.g., data chunk identifier 404) for each of the data chunks of the first group of data chunk sets in stream map 2322, to refer to the already stored sequences of data chunks matching the data chunk sequences of the first group. Stream map generator 2306 may generate the pointers in any manner, including as described elsewhere herein (e.g., stream map generator 2306 may include metadata generator 606 of FIG. 6).

For instance, continuing the above example, data chunk segmenter 2308 may include the first and third data chunk sets (data chunks 1-5 and 10-16) in the first group. Data chunk segmenter 2308 may generate store pointers indication 2320 to indicate that pointers to the stored sequences of data chunks corresponding to data chunks 1-5 and 10-16 are to be stored in stream map 2322 for data chunks 1-5 and 10-16.

In step 2212, data chunks of the plurality of data chunks other than data chunks in the first group of the data chunk sets are stored in the chunk container. For example, in an embodiment, data chunk segmenter 2308 may store data chunks 2318 in chunk container 304. Data chunks 2318 include the data chunks of the second group of data chunk sets designated by data chunk segmenter 2308. Furthermore, data chunk segmenter 2308 may generate a second store pointers indication 2320 for the second group of data chunk sets. The second store pointers indication 2320 is received by stream map generator 2306. The second store pointers indication 2320 instructs stream map generator to store a pointer in stream map 2322 to each of data chunks 2318 newly stored in chunk container 304 in step 2212.

For instance, continuing the above example, data chunk segmenter 2308 may include the second data chunk set (data chunks 6-9) in the second group. Data chunks 6-9 may be newly stored in chunk container 304 after the last data chunk currently stored therein. Data chunk segmenter 2308 may generate the second store pointers indication 2320 to indicate that pointers to newly stored data chunks 6-9 in chunk container 304 are to be stored in stream map 2322.

As such, in this example, when the data stream corresponding to data blocks 1-16 is rehydrated, the fragmentation of this 1 MB portion is limited to three, and therefore no more than three disk seeks are performed (a first seek for data chunks 1-5, a second seek for data chunks 6-9, and a third seek for data chunks 10-16). In contrast, if the data stream was fully optimized, there would be five disk seeks corresponding to the following five sets of data chunks: 1-5, 6, 7-8, 9, 10-16. As such, according to the embodiments of flowchart 2200 and FIG. 23, data deduplication rates may be reduced so that fragmentation is limited and predictable.

Figure 26:
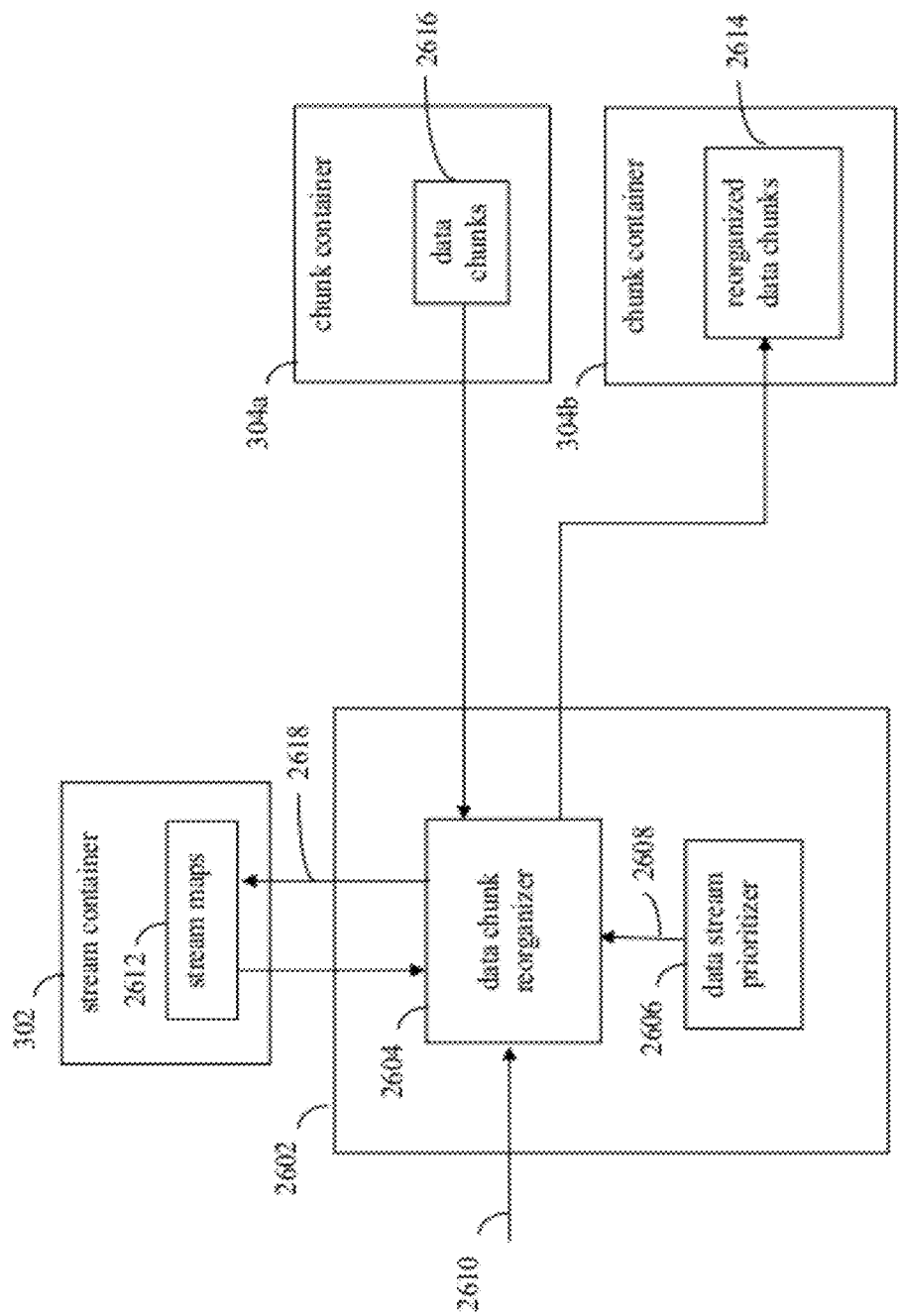
FIG. 26 shows a block diagram of a storage reorganization system used to reorganize data chunks stored in a chunk store, according to an example embodiment.

FIGS. 24 and 25 show flowcharts 2400 and 2500 for reorganizing stored data streams, according to another example embodiment. Flowcharts 2400 and 2500 are described with reference to FIG. 26, for purposes of illustration. FIG. 26 shows a block diagram of a storage reorganization system 2602 used to reorganize data chunks stored using stream container 302 and chunk container 304a, according to an example embodiment. In an embodiment, system 2602 may operate according to flowcharts 2400 and 2500. As shown in FIG. 26, storage reorganization system 2602 includes a data chunk reorganizer 2604 and a data stream prioritizer 2606. For instance, in an embodiment, storage reorganization system 2602 may be implemented in chunk store interface 116 or maintenance module 106 in FIG. 1. Further structural and operational embodiments will be apparent to persons skilled in the relevant art(s) based on the discussion regarding flowcharts 2400 and 2500. Flowcharts 2400 and 2500 and system 2602 are described as follows.

Flowchart 2400 begins with step 2402. In step 2402, a plurality of data streams are prioritized, the data streams being stored as data chunks in a chunk container and as stream maps that include pointers to corresponding data chunks. For example, as shown in FIG. 26, data chunk reorganizer 2604 receives a chunk store reorganization request 2610. Chunk store reorganization request 2610 is a request that a designated chunk store, such as the chunk store corresponding to stream container 302 and chunk container 304a, is to be reorganized. Request 2610 may be received from a user, may be automatically generated (e.g., on a periodic or non-periodic basis), or may have other source. Data stream prioritizer 2606 is configured to prioritize the data streams stored by the chunk store that includes stream container 302 and chunk container 304a. For example, in an embodiment, data stream prioritizer 2606 may be configured to analyze/calculate heuristics using various criteria, such as: a heat index (or other indication of access frequency) indicating how recently each data stream is accessed (more frequently accessed data streams can be given higher priority); a scenario or application (e.g., data stream used by a certain application may have higher priority than other data streams); data stream properties (such as FCI (file classification infrastructure) properties for files stored with regard to Microsoft Windows®); and/or other criteria. The heuristics may be used to prioritize the data streams in a ranking or order (e.g., in order of highest priority data stream to lowest priority data stream). As shown in FIG. 26, data stream prioritizer 2606 generates a data stream priorities 2608. Note that in an embodiment, the data stream priorities of data stream priorities 2608 may be stored in stream container 302 with stream maps 2612 (e.g., in the stream map metadata for each stream map).

In step 2404, a reorganization of the stored data chunks of the plurality of data streams is determined according to the prioritization. For instance, as shown in FIG. 26, data chunk reorganizer 2604 receives data stream priorities 2608. Data chunk reorganizer 2604 is configured to reorganize the data chunks 2616 stored in chunk container 304a according to data stream priorities 2608. For instance, data chunk reorganizer 2604 may be configured to reorganize the data chunks of the data streams data stream-by-data stream, starting with the highest priority data stream, and ending with the lowest priority data stream. In an embodiment, data chunk reorganizer 2604 is configured to relocate or redistribute data chunks in chunk container 304a, only relocating a data chunk if the relocation does not cause increased fragmentation of a data stream having higher priority than the data stream of the relocated data chunk.

In step 2406, a second chunk container is generated that stores the data chunks of the plurality of data streams according to the determined reorganization. For example, as shown in FIG. 26, data chunk reorganizer 2604 may generate a second chunk container 304b (e.g., as described elsewhere herein). Data chunk reorganizer 2604 stores reorganized data chunks 2614 in second chunk container 304b. Note that data chunks 2616 in first chunk container 304a and reorganized data chunks 2614 in second chunk container 304b may include the same data chunks. However, reorganized data chunks 2614 have a different order of storage in second chunk container 304b than do data chunks 2616 in first chunk container 304a. Note that in an alternative embodiment, rather than generating second chunk container 304a to store reorganized data chunks 2614, reorganized data chunks 2614 may be stored in first chunk container 304a.

In step 2408, pointers of the stream maps are modified to point to the data chunks stored in the second chunk container. For example, as shown in FIG. 26, data chunk reorganizer 2604 may generate updated pointers 2618 that are stored in stream maps 2612. Updated pointers 2618 includes pointers to the new locations of reorganized data chunks 2614 in second chunk container 304b that replace the pointers previously stored in stream maps 2612 to the prior locations of data chunks 2616 in first chunk container 304a.

As such, in embodiments, data chunk reorganizer 2604 may redistribute data chunks in chunk containers to be stored in a manner that higher priority data streams may have less fragmentation than do lower priority data streams. For example, in an embodiment, step 2404 may be performed by data chunk reorganizer 2604 on each data stream, in order of higher priority data stream to lower priority data stream, according to flowchart 2500 in FIG. 25. In step 2502, a data stream is selected. The selected data stream may have already been de-duplicated according to a process described herein or otherwise known. In step 2504, one or more data chunks pointed to by pointers of a stream map of the selected data stream are relocated to be more contiguous than prior to the relocating by displacing at least one data chunk of a data stream having a lower priority than the selected data stream. In other embodiments, data chunk reorganizer 2604 may redistribute data chunks in chunk containers in other ways.

As such, the embodiments of flowcharts 2400 and 2500 and FIG. 26 perform a background scan and reorganization of a chunk store such that data chunk locality is changed without compromising deduplication savings. For instance, a first data stream may have previously been optimized to have data chunks {C1, C2, C3, C4, C5} stored contiguously in chunk container 304a. A second data stream may have been subsequently optimized to have data chunks {C3, C4, C5, C6, C7}, such that data chunks C3-05 are stored in the form of pointers to C3-05 of the first data stream in chunk container 304a. As such, the first and second data streams may be stored as C1, C2, C3, C4, C5 . . . C6, C7 (where " . . . " represents one or more intervening data chunks). In this case, rehydration of the first data stream uses no extra seeks. However, rehydration of the second data stream uses an extra disk seek (to move from C3, C4, C5 to C6, C7) because data chunks C3-05 are stored within the optimized first data stream, and data chunks C6-C7 are stored within the optimized second data stream.

However, in this example, the second data stream may have 10 times the likelihood of data access than the first data stream. As such, the second data stream may have a higher priority than the first data stream, and therefore may be optimized at the expense of the first data stream according to the embodiments of flowcharts 2400 and 2500 and FIG. 26. For instance, the data chunks may be reorganized such that chunks C3-C7 are stored contiguously rather than chunks C1-C5. For instance, as shown above, the previous data chunk storage arrangement may be C1, C2, C3, C4, C5 . . . C6, C7. A reorganized data chunk storage arrangement may be C1, C2 . . . C3, C4, C5, C6, C7, where data chunks C3-05 were moved to be contiguous with data chunks C6 and C7. Furthermore, the stream maps corresponding to the first and second data streams may be modified to point to the new locations of data chunks C1-C7. After this defragmentation is performed, rehydration of the first data stream uses one disk seek (to move the disk head from C1, C2 to C3, C4, C5) while rehydration of the second data stream uses no disk seeks.

III Example Computing Device Embodiments

Data deduplication module 104, maintenance module 106, data stream API 110, chunk maintenance API 112, data access API 114, chunk store interface 116, data stream parser 602, data chunk storage manager 604, metadata generator 606, stream map generator 608, metadata collector 802, locality indicator generator 804, rehydration module 1102, redirection table modifier 1702, generation incrementer 1704, data stream assembler 1902, generation checker 1906, data chunk retriever 1908, data stream storage system 2102, data chunk accumulator 2104, stream map generator 2106, sequence comparator 2110, sequence determiner 2122, data stream storage system 2302, data chunk sequencer 2304, stream map generator 2306, data chunk segmenter 2308, storage reorganization system 2602, data chunk reorganizer 2604, and data stream prioritizer 2606 may be implemented in hardware, software, firmware, or any combination thereof. For example, data deduplication module 104, maintenance module 106, data stream API 110, chunk maintenance API 112, data access API 114, chunk store interface 116, data stream parser 602, data chunk storage manager 604, metadata generator 606, stream map generator 608, metadata collector 802, locality indicator generator 804, rehydration module 1102, redirection table modifier 1702, generation incrementer 1704, data stream assembler 1902, generation checker 1906, data chunk retriever 1908, data stream storage system 2102, data chunk accumulator 2104, stream map generator 2106, sequence comparator 2110, sequence determiner 2122, data stream storage system 2302, data chunk sequencer 2304, stream map generator 2306, data chunk segmenter 2308, storage reorganization system 2602, data chunk reorganizer 2604, and/or data stream prioritizer 260 may be implemented as computer program code configured to be executed in one or more processors. Alternatively, data deduplication module 104, maintenance module 106, data stream API 110, chunk maintenance API 112, data access API 114, chunk store interface 116, data stream parser 602, data chunk storage manager 604, metadata generator 606, stream map generator 608, metadata collector 802, locality indicator generator 804, rehydration module 1102, redirection table modifier 1702, generation incrementer 1704, data stream assembler 1902, generation checker 1906, data chunk retriever 1908, data stream storage system 2102, data chunk accumulator 2104, stream map generator 2106, sequence comparator 2110, sequence determiner 2122, data stream storage system 2302, data chunk sequencer 2304, stream map generator 2306, data chunk segmenter 2308, storage reorganization system 2602, data chunk reorganizer 2604, and/or data stream prioritizer 260 may be implemented as hardware logic/electrical circuitry.

Figure 27:
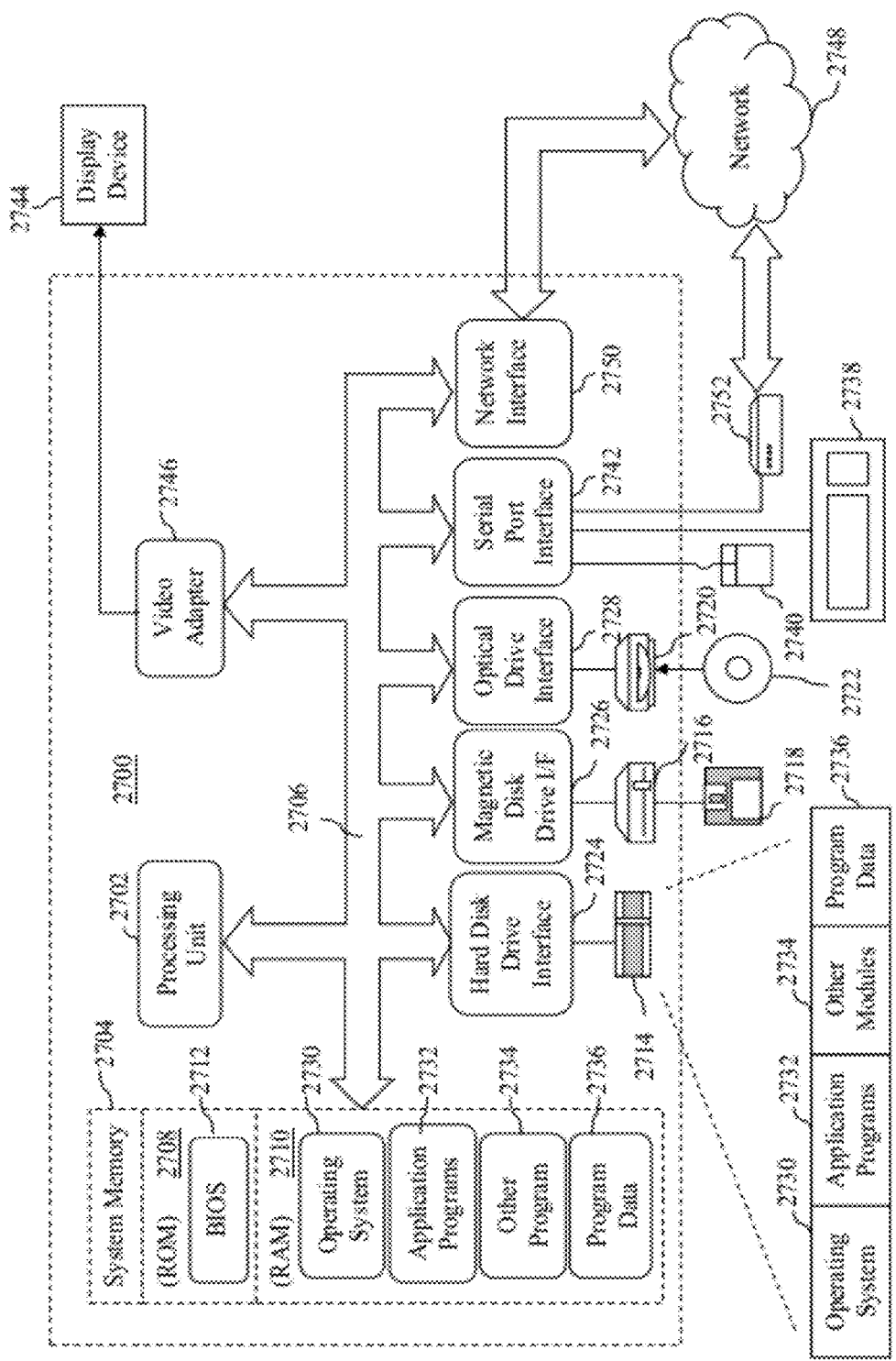
FIG. 27 shows a block diagram of an example computer that may be used to implement embodiments of the present invention.

FIG. 27 depicts an exemplary implementation of a computer 2700 in which embodiments of the present invention may be implemented. For example, storage system 102, and/or any portion thereof, may be implemented in one or more computer systems similar to computer 2700, including one or more features of computer 2700 and/or alternative features. Computer 2700 may be a general-purpose computing device in the form of a conventional personal computer, a mobile computer, or a workstation, for example, or computer 2700 may be a special purpose computing device. The description of computer 2700 provided herein is provided for purposes of illustration, and is not intended to be limiting. Embodiments of the present invention may be implemented in further types of computer systems, as would be known to persons skilled in the relevant art(s).

As shown in FIG. 27, computer 2700 includes a processing unit 2702, a system memory 2704, and a bus 2706 that couples various system components including system memory 2704 to processing unit 2702. Bus 2706 represents one or more of any of several types of bus structures, including a memory bus or memory controller, a peripheral bus, an accelerated graphics port, and a processor or local bus using any of a variety of bus architectures. System memory 2704 includes read only memory (ROM) 2708 and random access memory (RAM) 2710. A basic input/output system 2712 (BIOS) is stored in ROM 2708.

Computer 2700 also has one or more of the following drives: a hard disk drive 2714 for reading from and writing to a hard disk, a magnetic disk drive 2716 for reading from or writing to a removable magnetic disk 2718, and an optical disk drive 2720 for reading from or writing to a removable optical disk 2722 such as a CD ROM, DVD ROM, or other optical media. Hard disk drive 2714, magnetic disk drive 2716, and optical disk drive 2720 are connected to bus 2706 by a hard disk drive interface 2724, a magnetic disk drive interface 2726, and an optical drive interface 2728, respectively. The drives and their associated computer-readable media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 2730, one or more application programs 2732, other program modules 2734, and program data 2736. Application programs 2732 or program modules 2734 may include, for example, computer program logic for implementing data deduplication module 104, maintenance module 106, data stream API 110, chunk maintenance API 112, data access API 114, chunk store interface 116, data stream parser 602, data chunk storage manager 604, metadata generator 606, stream map generator 608, metadata collector 802, locality indicator generator 804, rehydration module 1102, redirection table modifier 1702, generation incrementer 1704, data stream assembler 1902, generation checker 1906, data chunk retriever 1908, data stream storage system 2102, data chunk accumulator 2104, stream map generator 2106, sequence comparator 2110, sequence determiner 2122, data stream storage system 2302, data chunk sequencer 2304, stream map generator 2306, data chunk segmenter 2308, storage reorganization system 2602, data chunk reorganizer 2604, data stream prioritizer 260, flowchart 700, flowchart 900, flowchart 1600, flowchart 1800, flowchart 2000, flowchart 2200, flowchart 2400, and/or flowchart 2500 (including any step of flowcharts 700, 900, 1600, 1800, 2000, 2200, 2400, and 2500).

A user may enter commands and information into the computer 2700 through input devices such as keyboard 2738 and pointing device 2740. Other input devices (not shown) may include a microphone, joystick, game pad, satellite dish, scanner, or the like. These and other input devices are often connected to the processing unit 2702 through a serial port interface 2742 that is coupled to bus 2706, but may be connected by other interfaces, such as a parallel port, game port, or a universal serial bus (USB).

A display device 2744 is also connected to bus 2706 via an interface, such as a video adapter 2746. In addition to the monitor, computer 2700 may include other peripheral output devices (not shown) such as speakers and printers.

Computer 2700 is connected to a network 2748 (e.g., the Internet) through an adaptor or network interface 2750, a modem 2752, or other means for establishing communications over the network. Modem 2752, which may be internal or external, is connected to bus 2706 via serial port interface 2742.

As used herein, the terms "computer program medium" and "computer-readable medium" are used to generally refer to media such as the hard disk associated with hard disk drive 2714, removable magnetic disk 2718, removable optical disk 2722, as well as other media such as flash memory cards, digital video disks, random access memories (RAMs), read only memories (ROM), and the like.

As noted above, computer programs and modules (including application programs 2732 and other program modules 2734) may be stored on the hard disk, magnetic disk, optical disk, ROM, or RAM. Such computer programs may also be received via network interface 2750 or serial port interface 2742. Such computer programs, when executed or loaded by an application, enable computer 2700 to implement features of embodiments of the present invention discussed herein. Accordingly, such computer programs represent controllers of the computer 2700.

The invention is also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method, comprising:
   parsing a data stream into a sequence of data chunks;
   determining whether any of the sequence of data chunks are stored in a chunk container that includes a plurality of data chunks;
   storing, in a contiguous arrangement and in a same sequence in the chunk container as in the data stream, data chunks of the sequence of data chunks determined to not be stored in the chunk container;

generating a stream map that is a data structure that describes a mapping between a structure of the data stream and an optimized structure of the data chunks stored in the chunk container to enable data chunks referenced in the stream map to be located in the chunk container, the optimized structure including data chunks that have been deduplicated, the stream map including metadata for each data chunk of the sequence; and including, in the metadata for each of the data chunks stored in the contiguous arrangement, a same locality indicator value that indicates the contiguous arrangement and indicates that each of the data chunks stored in the contiguous arrangement is associated with the generated stream map.

2. The method of claim 1, further comprising:

generating the metadata for each data chunk of the sequence of data chunks, the metadata for a data chunk of the sequence of data chunks including an offset for the data chunk in the data stream, a pointer to a location in the chunk container for the data chunk, and the locality indicator for the data chunk.

3. The method of claim 2, further comprising:

persisting the stream map in a chunk store that includes the chunk container.

4. The method of claim 1, further comprising:

parsing a second data stream into a second sequence of data chunks;

determining that a first set of data chunks of the second sequence of data chunks includes one or more data chunks that are duplicates of data chunks already stored in the chunk container and that a second set of data chunks of the second sequence of data chunks is not stored in the chunk container;

storing the second set of data chunks in the chunk container in a contiguous arrangement following the stored data chunks of the first sequence of data chunks and in a same sequence as in the second data stream; and storing a pointer for each of the first set of data chunks to the corresponding data chunk already stored in the chunk container.

5. The method of claim 4, wherein each data chunk of the second data stream has associated the metadata including an offset for the data chunk in the second data stream, a pointer to a location in the chunk container for the data chunk, and the locality indicator for the data chunk, wherein each data chunk in the first sequence of data chunks has a first value for the locality indicator, the method further comprising:

assigning the first value to the locality indicator for each data chunk of the first set of data chunks;

select a new locality indicator value associated with the second data stream; and assigning the new locality indicator value to the locality indicator for each data chunk in the second set of data chunks.

6. The method of claim 1, further comprising:

in response to a request for a data stream,
performing a first seek to locate a first data chunk of a first set of data chunks of the requested data stream in the chunk container,
sequentially reading the first set of data chunks from the chunk container,
performing a second seek to locate a first data chunk of a second set of data chunks of the requested data stream in the chunk container, and
sequentially reading the second set of data chunks from the chunk container.

7. The method of claim 1, further comprising:

generating a redirection table associated with the chunk container that stores information regarding data chunk location changes.

8. The method of claim 7, further comprising:

receiving a request for a data chunk, the request including an identifier for the data chunk, the data chunk identifier including a chunk container identifier, a local identifier, a chunk container generation value, and a first chunk offset value;

determining that a generation indication for the chunk container matching the chunk container identifier received in the request does not match the chunk container generation value received in the request;

searching the redirection table for an entry that includes a match for the local identifier, the entry including a second chunk offset value that is different from the first chunk offset value; and retrieving the data chunk from the chunk container at the second chunk offset value.

9. The method of claim 8, wherein the generation indication for the chunk container and the chunk container identifier are included in a header for the chunk container, the method further comprising:

modifying the contents of the chunk container;

adding one or more entries to the redirection table that indicate changed chunk offset values for one or more data chunks of the chunk container due to said modifying; and increasing the generation indication in the chunk container header due to said modifying.

10. The method of claim 8, further comprising:

replacing the first chunk offset value with the second chunk offset value in a stream map associated with the data stream; and deleting the entry from the redirection table.

11. The method of claim 7, wherein the information regarding data chunk location changes maps an immutable per-container chunk identifier to a new offset value.

12. A method for storing a data stream, comprising:

(a) generating a stream map for the data stream that includes stream metadata;

(b) storing an indication of a minimum allowable number of repeating data chunks in a chunk container;

(c) accumulating a sequence of data chunks from the data stream;

(d) determining whether the accumulated sequence of data chunks is a duplicate of any stored sequence of data chunks, the stored sequence of data chunks being stored contiguously in the chunk container;

(e) in response to determining the accumulated sequence of data chunks is a duplicate of a stored sequence of data chunks, determining whether the accumulated sequence of data chunks includes a number of data chunks that is greater than or equal to the stored indication; and (f) storing in the stream metadata pointers to the stored sequence of data chunks in response to determining the accumulated sequence of data chunks to have a number of data chunks that is greater than or equal to the stored indication.

13. The method of claim 12, further comprising:

(g) in response to determining the accumulated sequence of data chunks is not a duplicate of any stored sequence of data chunks having a number of data chunks great than or equal to the stored indication, storing a first data chunk of the accumulated sequence in the chunk container, removing the first data chunk from the accumulated sequence of data chunks, accumulating at least one additional data chunk in the accumulated sequence of data chunks to generate an updated accumulated sequence of data chunks.

14. The method of claim 13, further comprising:
repeating (b)-(g) until each data chunk of the data stream is stored according to (f) or (g).

15. The method of claim 12, further comprising:
completing generation of the stream map; and
storing the stream map in a stream container.

16. A method, comprising:
receiving a portion of a data stream that includes a plurality of data chunks;

determining a plurality of data chunk sequences in the plurality of data chunks, each determined data chunk sequence including a sequence of data chunks duplicating a stored sequence of data chunks stored contiguously in a chunk store;

segmenting the plurality of data chunks into a number of data chunk sets corresponding to a fragmentation factor, where the data chunks of each determined data chunk sequence are included together in a data chunk set and the fragmentation factor indicates a maximum fragmentation for the segmenting of the plurality of data chunks;

storing data chunks of a first group of the data chunk sets as pointers in data stream metadata to existing data chunks without storing data of the data chunks of the first group, the first group including data chunks sets that are sequences of data chunks duplicating sequences in the chunk store; and storing data chunks of a second group of the data chunk sets other than data chunks in the first group of the data chunk sets as new contiguous data chunks in the chunk store, the second group at least including data chunks that are not duplicates of data chunks in the chunk store.

17. The method of claim 16, wherein said segmenting comprises:

segmenting the plurality of data chunks into a number of data chunk sets less than or equal to the fragmentation factor.

18. The method of claim 16, further comprising:
storing duplicate data chunks of the second group of the data chunk sets in the chunk store.

19. The method of claim 16, further comprising:
storing the data chunks of the second group of data chunks as second pointers in the data stream metadata.

* * * * *